(12) United States Patent
Baskaran et al.

(10) Patent No.: US 10,558,479 B2
(45) Date of Patent: Feb. 11, 2020

(54) SYSTEMS AND METHODS FOR AUTOMATIC DATA MANAGEMENT FOR AN ASYNCHRONOUS TASK-BASED RUNTIME

(71) Applicant: Reservoir Labs, Inc., New York, NY (US)

(72) Inventors: Muthu Manikandan Baskaran, Old Tappan, NJ (US); Benoit J. Meister, New York, NY (US); Benoit Pradelle, Brooklyn, NY (US)

(73) Assignee: Reservoir Labs, Inc., New York, NY (US)

( * ) Notice: Subject to any disclaimer, the term of this patent is extended or adjusted under 35 U.S.C. 154(b) by 0 days.

(21) Appl. No.: 16/363,278

(22) Filed: Mar. 25, 2019

(65) Prior Publication Data

US 2019/0220295 A1    Jul. 18, 2019

Related U.S. Application Data

(63) Continuation of application No. 15/821,952, filed on Nov. 24, 2017, now Pat. No. 10,241,811.

(60) Provisional application No. 62/425,949, filed on Nov. 23, 2016.

(51) Int. Cl.
  *G06F 9/44* (2018.01)
  *G06F 9/455* (2018.01)
  *G06F 8/41* (2018.01)

(52) U.S. Cl.
  CPC ........... *G06F 9/45516* (2013.01); *G06F 8/41* (2013.01); *G06F 8/443* (2013.01)

(58) Field of Classification Search
  CPC ....................................................... G06F 9/44
  See application file for complete search history.

(56) References Cited

U.S. PATENT DOCUMENTS

| | | | | |
|---|---|---|---|---|
| 6,134,514 A * | 10/2000 | Liu | ........ | H04L 41/145 703/17 |
| 6,467,021 B1 * | 10/2002 | Sinclair | ......... | G06F 3/0601 710/68 |
| 2007/0261042 A1 * | 11/2007 | Chen | ............ | G06F 8/4442 717/148 |
| 2015/0277876 A1 * | 10/2015 | Yamanaka | ......... | G06F 8/423 717/152 |

\* cited by examiner

*Primary Examiner* — Jae U Jeon
(74) *Attorney, Agent, or Firm* — Goodwin Procter LLP

(57) ABSTRACT

A compilation system can define, at compile time, the data blocks to be managed by an Even Driven Task (EDT) based runtime/platform, and can also guide the runtime/platform on when to create and/or destroy the data blocks, so as to improve the performance of the runtime/platform. The compilation system can also guide, at compile time, how different tasks may access the data blocks they need in a manner that can improve performance of the tasks.

22 Claims, 17 Drawing Sheets

Origin of full data tile partitions shifted to align with data access patterns within computations that could enable better co-location of EDTs and DBs to reduce communications.

FIG. 3A
FIG. 3B
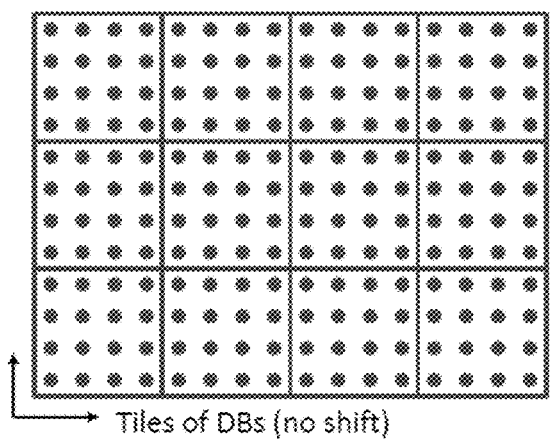
Tiles of DBs (no shift)
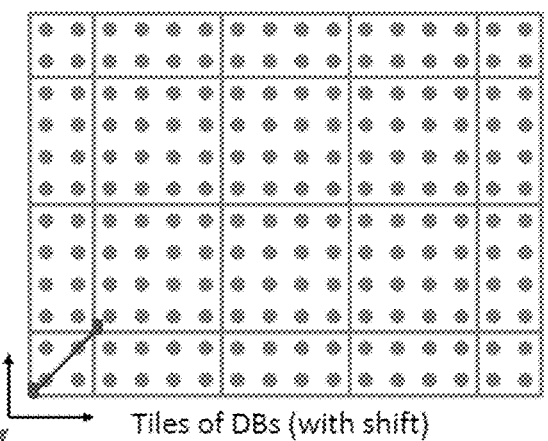
Tiles of DBs (with shift)
Origin of full data tile partitions shifted to align with data access patterns within computations that could enable better co-location of EDTs and DBs to reduce communications.
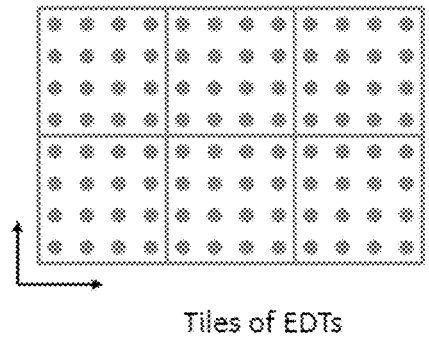
Tiles of EDTs
FIG. 3C 1    for each variable v
       v = DBFetchDirect(v) / DBFetchCopy(v)
    Compute()

2    for each successor s
       relevantDBs = DBEnumerate(s)
       createEDT(s, ..., relevantDBs)

FIG. 6

SYSTEMS AND METHODS FOR AUTOMATIC DATA MANAGEMENT FOR AN ASYNCHRONOUS TASK-BASED RUNTIME

CROSS-REFERENCE TO RELATED PATENT APPLICATIONS

This application of is as continuation of U.S. application Ser. No. 15/821,952, filed on Nov. 24, 2017, which claims benefit of priority to U.S. Provisional Patent Application Ser. No. 62/425,949 entitled "Systems and Methods for Automatic Data Management for an Asynchronous Task-Based Runtime," filed on Nov. 23, 2016, the contents of which are incorporated herein by reference in their entirety.

FIELD OF THE INVENTION

This disclosure generally relates to code-generation techniques using a compiler where the code is targeted to an Event Driven Task (EDT) based platform having several processing nodes and, in particular, to managing data blocks needed by the platform in a manner that can improve the performance of the platform.

BACKGROUND

Due to hardware scaling and low-power requirements, new processor and system architectures are being investigated, designed, and developed for exascale and extreme-scale computing. As a common theme, these architectures have a large numbers (e.g., tens, hundreds, or thousands) of cores that can react heterogeneously to their environment, and may be constrained by their global energy consumption. The computing devices may be operated at "near threshold voltage" (NTV), as lowering supply voltage can produce a quadratic improvement in power efficiency of computing devices with generally only a linear slowdown in throughput. Consequently it is possible to get improved power utilization as long as an increase in parallelism can be found to offset the linear slowdown. Another important consequence of lowering the supply voltage near threshold is that variations in device performance are exacerbated. Thus, beyond any intrinsic imbalance from the application itself, the hardware often creates imbalance.

The need for extracting more concurrency, reducing synchronization, and addressing the hardware imbalance generally imposes tall requirements on the software. The software to be executed desirably should be as parallel as possible to take advantage of the cores, and/or adaptable to changing core capabilities, and desirably should avoid wasting energy or should minimize wasted energy.

One way to address this problem is to depart from the Bulk-Synchronous Programming (BSP) model. While BSP model has promoted parallelism by enabling simple programming models such as loop parallelism and Single Program Multiple Data (SPMD) computations, the model may stand in the way of amounts of parallelism sought out. First, bulk synchronizations (across iterations of a "for" loop, for instance) often express an over-approximation of the actual dependences among computation instances (whether they are tasks or loop iterations). Also, synchrony often results in a loss of parallelism and a waste of energy, since cores spend a portion of their time waiting for some condition to occur (e.g., a barrier to be reached by other cores, a spawned task to return, etc.).

Event-driven task (EDT) model is emerging as an effective solution for new extreme-scale architectures. In this model, programs may be written as graphs of event-driven tasks, and can be asynchronous and non-bulk. Tasks are "scheduled" for asynchronous execution and they become runnable whenever their input data is ready. In this model, the more accurate the inter-task dependences are with respect to the semantics of the program, the more parallelism can be exposed. This model can improves dynamic load balancing, which makes it an attractive choice for extreme-scale systems, especially, near threshold computing (NTC) systems.

It is impractical, however, to expect programmers to write directly in the EDT form; the expression of explicit dependences between tasks is cumbersome, requiring a significant expansion in the number of lines of code, and making the code opaque to visual inspection and/or debugging. Therefore, in general a high-level compiler and optimization tool is a key component of an extreme-scale/exascale software stack, to attain performance, programmability, productivity, and sustainability for such application software.

Previously Published and Commercialized Version of R-Stream™ Compiler

A previously published and commercialized version of R-Stream™ (referred to as "Published R-Stream™") is an example of a source-to-source automatic parallelization and optimization tool targeted at a wide range of architectures including multicores, GPGPU, and other hierarchical, heterogeneous architectures including exascale architectures such as Traleika Glacier. Without automatic mapping, the management of extreme scale features would generally require writing longer software programs (having more lines of code), thus requiring more effort to produce software, and such programs may be less portable, and may be error-prone. Published R-Stream™ provides advanced polyhedral optimization methods and is known for features that can transform programs to find more concurrency and locality, and for features that can manage communications and memory hardware explicitly as a way of saving energy.

Published R-Stream™ is a high-level automatic parallelization tool, performing mapping tasks, which may include parallelism extraction, locality improvement, processor assignment, managing the data layout, and generating explicit data movements. Published R-Stream™ can read sequential programs written in C as input, automatically determine the mapping of the code portions to processing units, based on the target machine, and output transformed code. Published R-Stream™ can handle high-level transformations described above, and the resulting source code output by Published R-Stream™ generally needs to be compiled using a traditional low-level compiler.

Published R-Stream™ typically works by creating a polyhedral abstraction from the input source code. This abstraction is encapsulated by a generalized dependence graph (GDG), the representation used in the Published R-Stream™ polyhedral mapper. Published R-Stream™ can explore an unified space of all semantically legal sequences of traditional loop transformations. From a statement-centric point of view in the polyhedral abstraction, such a sequence of transformations can be represented by a single schedule (e.g., a rectangular parametric integer matrix). The Published R-Stream™ optimizer may add capabilities to express the mathematical link between high-level abstract program properties and variables in this unified space. These properties include parallelism, locality, contiguity of memory references, vectorization/SIMDization, and data layout permutations.

Event-Driven Task (EDT) Based Runtimes/Platforms

There are several EDT-based runtimes (generally referred to as EDT platforms) that are being developed in the community for exascale systems such as Open Community Runtime (OCR), Concurrent Collections (CnC), SWift Adaptive Runtime Machine (SWARM), Realm, Charm++, and others. We have developed a hierarchical mapping solution using auto-parallelizing compiler technology to target three different EDT runtimes, namely, OCR, CnC, and SWARM. Specifically, we developed (1) a mapping strategy with selective trade-offs between parallelism and locality to extract fine-grained EDTs, and (2) a retargetable runtime API that captures common aspects of the EDT programming model and allows for uniform translation, porting, and comparisons between the different runtimes. We also developed a generic polyhedral compilation approach to compile programs for execution of EDT platforms.

OCR

OCR is an open-source EDT runtime platform that presents a set of runtime APIs for asynchronous task-based parallel programming models suited for exascale systems. The main paradigms in OCR are: (1) Event-driven tasks (EDTs), (2) Data Blocks (DBs), and (3) Events. All EDTs, DBs, and events have a global unique ID (GUID) that identifies them across the platform. EDTs are the units of computation in OCR. All EDTs need to declare a set of dependencies to which DBs or events can be associated. An EDT does not begin execution until all its dependencies have been satisfied. EDTs are intended to be non-blocking pieces of code and they are expected to communicate with other EDTs through the DBs (which are the units of storage) and events. All user data needs to be in the form of DBs and to be controlled by the runtime since the runtime can relocate and replicate DB s for performance, power, or resilience reasons.

Events provide a mechanism for creating data and control dependencies in OCR. An event can be associated with a DB or can be empty. An event that is associated with a DB can be used to pass data to the EDTs waiting on that event. This dependence can be understood as control+data dependence. An event without a DB associated therewith can be used to trigger EDTs waiting on the event. This dependence can be understood as control dependence. Pure data dependence can be encoded by attaching a DB in a dependence slot to an EDT.

A compiler generally creates an OCR program by constructing a dynamic acyclic graph of EDTs, DBs, and events. To this end, a compiler such as Published R-Stream™ can generate tasks (EDTs) and events from the specified program source code. Data blocks, however, generally need to be defined in the source code. Moreover, various known compilation and manual techniques that can guide the creation of data blocks by the EDT runtime/platform do not guide the EDT platform as to when the DBs may be created and/or destroyed. The known techniques also do not customize access to the DBs based on their usage by the tasks, and rely simply on the access mechanisms provided by the EDT runtime/platform. This can limit the performance of the EDT platform while executing a platform, e.g., in terms of speed of execution, memory load, and/or power and/or energy consumption.

SUMMARY

We describe new compilation techniques to automate the synthesis of scalable codes that can be executed on an EDT runtime/platform, where the scalable codes are derived from sequential codes. Various embodiments described herein feature compilation techniques that can generate code instructions at compile time that can guide the runtime creation, usage, and destruction of data blocks by an EDT runtime/platform so as to improve the performance there of in terms execution speed, memory load, and/or power and/or energy consumption. This is achieved in part by defining the data blocks based on one or more hardware characteristics of the EDT runtime/platform and the definition may also be based on the data-usage characteristics of one or more task created by the compiler. The compiler may also guide the EDT runtime/platform as to when to create different data blocks and when to destroy them, which can minimize the startup overhead and/or memory load of the platform, increasing the overall performance thereof. Performance improvement can also be achieved, in part, by customizing at compile time the subsequent runtime access to the data blocks by one or more tasks, where the customization is generally based on data usage by the tasks.

Accordingly, in one aspect, a method is provided for creating, distributing, and deleting data blocks to be used by one or more tasks to be executed by a number of processing nodes in an event-driven task (EDT) platform. The method includes performing, by a processor configured as a compiler, compile-time operations that include: identifying a first data variable in the source code of the program, and determining from the source code a size and initialization of the first data variable. The method also includes determining a first set of data blocks associated with the first data variable, where the determination is based on at least one of: (i) a specified data block size, (ii) a number of processing nodes in the EDT platform; and (iii) memory capacity at a processing node in the EDT platform. The method further includes specifying in a modified program, a first data-block-creation task for creating and initializing a first data block from the first set of data blocks during execution of the modified program by the EDT platform. The steps described above may be repeated for one or more other data variables in the source code, defining corresponding data blocks.

The compile-time operations may include identifying a first program-based task using the first data variable; and determining usage of the first data variable by the first program-based task. The usage may be described using at least one of: (i) an order of dimensions of the first data variable, (ii) a tile size associated with the first data variable, (iii) a number of data elements of the first data variable that are used by the first program-based task, and (iv) contiguity of the data elements of the first data variable that are used by the first program-based task. Determining the first set of data blocks associated with the first data variable may be further based on, at least in part, the determined usage of the first data variable by the first program-based task.

In some embodiments, the compile-time operations may include identifying for the first data block from the first set of data blocks, all tasks using the first data block, and designating the first data-block-creation task as a predecessor to all tasks using the first data block. The compile-time operations may further include assembling a group of predecessor tasks by inserting in the group each immediate predecessor task of each task using the first data block, wherein none of the predecessor tasks uses the first data block. The compile-time operations may also include designating each predecessor task in the group as a predecessor of the first data-block-creation task. Alternatively, in some embodiments, the compile-time operations may include: assembling a group of predecessor tasks by inserting in the group each predecessor task of each task using the first data block, wherein none of the predecessor tasks uses the first data block; and designating at least one predecessor task in the group as a predecessor of the first data-block-creation task. The group of predecessors may include predecessor(s) of immediate predecessor(s), their predecessors, etc.

In some embodiments, the compile-time operations include identifying for the first data block from the first set of data blocks, all tasks using the first data block; specifying in the modified program, a first data-block-deletion task for deleting the first data block; and designating each task using the first data block as a predecessor to the first data-block-deletion task. The compile-time operations may include assembling a group of successor tasks by inserting in the group each immediate successor task of each task using the first data block, wherein none of the immediate successor tasks uses the first data block; and designating each successor task in the group as a successor of the first data-block-deletion task. Alternatively, in some embodiments, the compile-time operations include assembling a group of successor tasks by inserting in the group each successor task (including immediate successor(s), their successor(s), successor(s) of their successor(s), etc.) of each task using the first data block, wherein none of the successor tasks uses the first data block; and designating at least one successor task in the group as a successor of the first data-block-deletion task.

In some embodiments, the compile-time operations include identifying a first program-based task using the first data variable; and associating with the first program-based task an EDT platform directive for data block distribution based on the first set of data blocks. The compile-time operations may include identifying a first program-based task using the first data variable; and identifying a data object within the first program-based task, wherein the data object is associated with the first data block. The compile-time operations may also include identifying: (i) a first set of data elements of the data object that the first program-based task reads only and does not write; and (ii) a second set of data elements of the data object that the first program-based task writes; and determining the first set of data blocks by including therein: (i) at least one data block that includes at least a portion of the first set of data elements and excludes the second set of data elements; and (ii) at least one data block that includes at least a portion of the second set of data elements and excludes the first set of data elements.

In some embodiments, the compile-time operations include generating EDT platform directives for distribution of the first set of data blocks across the several processing nodes of the EDT platform based on a position of each data block in the first data variable. The directive may be based on a specified manner of data block distribution. The compile-time operations may include identifying a first program-based task associated with the source code of the program, the first program-based task using the first data variable, and determining a number of data objects that are associated with the first data variable and that are used by the first program-based task. The compile-time operations may also include identifying from the several data blocks a set of data blocks that is associated with the several data objects; and associating with the first-program based task an EDT platform directive for data block distribution based on the respective set of data blocks.

In another aspect, a system is provided for creating, distributing, and deleting data blocks to be used by one or more tasks to be executed by a number of processing nodes in an event-driven task (EDT) platform. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both.

The instructions in the first memory configure the processing unit as a compiler programmed to: identify a first data variable in the source code of the program, and determine from the source code a size and initialization of the first data variable. The instructions also program the processing unit to determine a first set of data blocks associated with the first data variable, where the determination is based on at least one of: (i) a specified data block size, (ii) a number of processing nodes in the EDT platform; and (iii) memory capacity at a processing node in the EDT platform. The instructions further program the processing unit to specify in a modified program, a first data-block-creation task for creating and initializing a first data block from the first set of data blocks during execution of the modified program by the EDT platform. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, for creating, distributing, and deleting data blocks to be used by one or more tasks to be executed by a number of processing nodes in an event-driven task (EDT) platform. The instructions configure the processing unit as a compiler programmed to: identify a first data variable in the source code of the program, and determine from the source code a size and initialization of the first data variable. The instructions also program the processing unit to determine a first set of data blocks associated with the first data variable, where the determination is based on at least one of: (i) a specified data block size, (ii) a number of processing nodes in the EDT platform; and (iii) memory capacity at a processing node in the EDT platform. The instructions further program the processing unit to specify in a modified program, a first data-block-creation task for creating and initializing a first data block from the first set of data blocks during execution of the modified program by the EDT platform. In various embodiments, the instructions can program the processing unit to perform one or more of the method steps described above.

In another aspect, a method is provided for facilitating data access by a task to be executed by one of several processing nodes in an event-driven task (EDT) platform. The method includes performing, by a processor configured as a compiler, compile-time operations that include: identifying a first data object used by a first task that is derived from source code of a program and that is executable on a first processing node of the EDT platform. A data object, as read/written by a task can be: (i) a data block; (ii) a portion of a data block; (iii) a combination of two or more data blocks; or (ii) a combination of portions of two or more data blocks. The compile-time operations also include identifying a first data block associated with the first data object, the first data block being stored at a second processing node. In some cases, the second node is the same as the first node; in general they are different. The compile-time operations additionally include computing a data access parameter corresponding to the first data object; and if the data access parameter is at least equal to a specified threshold, inserting in the first task a customized data access operation, for accessing the first data block via a local copy thereof at the first processing node; and otherwise, inserting in the first task a data access operation supplied by the EDT platform, for accessing the first data block from the second processing node.

The data access parameter may include a reuse factor associated with the first data object, and the compile-time operations may include computing the reuse parameter by counting and using a number of accesses within the first task to the first data object; and by determining and using at least one of: a number of data elements in the first data block, size of a data element in the first data block, a number of data elements in the first data object, and size of a data element in the first data object. Alternatively, the compile-time operations may include computing the data access parameter by determining and using at least one of a number of data elements in the first data block, size of a data element in the first data block, a number of data elements in the first data object, size of a data element in the first data object, expected time to copy the first data block, and expected time to construct the first data object at the first node.

Inserting the operations for accessing the first data block via the local copy thereof may include inserting operations for at least one of: copying from the second processing node at least a portion of the first data block into a local buffer at the first processing node, the local copy comprising contents of the local buffer; and translating a global address associated with the first data object into a local address associated with the local copy.

A characteristic of the first data block may be different from a corresponding characteristic of the local copy. The characteristic can include: a dimensionality of the first data block, a size of the first data block, a number of data elements in the first data block, and contiguity of the first data block. In some embodiments, the compile-time operations include identifying a second data block associated with the first data object, the second data block being stored at a third processing node; and configuring the customized data access operation for accessing the second data block via a local copy thereof at the first processing node, by copying from the third processing node at least a portion of the second data block into the local buffer at the first processing node.

In some embodiments, the first task includes a loop nest having at least one loop, and inserting the operations for accessing the first data block via the local copy thereof may include hoisting the operations for accessing the first data block via the local copy thereof outside of at least one loop of the loop nest. The first task comprises a loop nest having at least one loop, and inserting the operations for accessing the first data block from the second processing node via the function supplied by the EDT platform may include hoisting the operations for accessing the first data block from the second processing node via the function supplied by the EDT platform outside of at least one loop of the loop nest.

In some embodiments, the compile-time operations include selecting a data variable specified in the source code of the program; determining a number of data blocks associated with the data variable; and generating EDT platform directives for distribution of the several data blocks across several of processing nodes of the EDT platform based on a position of each data block in the corresponding data variable, the directive being based on a specified manner of data block distribution. The compile-time operations may include deriving a second task associated with the source code of the program, the second task using a data variable specified in the source code of the program; and determining a number of data objects that are associated with the data variable and that are used by the second task. The compile-time operations may also include determining a number of data blocks associated with the data variable; identifying from the several data blocks a set of data blocks that is associated with the several data objects; and associating with the second task an EDT platform directive for data block distribution based on the respective set of data blocks. The second task can be the first task, or it can be a different task.

In some embodiments, the compile-time operations include deriving a second task associated with the source code of the program, and identifying a second data object associated with the second task. The compile-time operations may also include identifying: (i) a first set of data elements of the second data object that the second task reads only and does not write; and (ii) a second set of data elements of the second data object that the second task writes; and determining a number of data blocks associated with the second data object, wherein the several data blocks include: (i) at least one data block that includes at least a portion of the first set of data elements and excludes the second set of data elements; and (ii) at least one data block that includes at least a portion of the second set of data elements and excludes the first set of data elements.

In another aspect, a system is provided for facilitating data access by a task to be executed by one of several processing nodes in an event-driven task (EDT) platform. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory configure the processing unit as a compiler programmed to: identify a first data object used by a first task that is derived from source code of a program and that is executable on a first processing node of the EDT platform. A data object, as read/written by a task can be: (i) a data block; (ii) a portion of a data block; (iii) a combination of two or more data blocks; or (ii) a combination of portions of two or more data blocks.

The processing unit configured as a compiler is also programmed to identify a first data block associated with the first data object, the first data block being stored at a second processing node. In some cases, the second node is the same as the first node; in general they are different. The processing unit is further programmed to compute a data access parameter corresponding to the first data object; and if the data access parameter is at least equal to a specified threshold, insert in the first task a customized data access operation, for accessing the first data block via a local copy thereof at the first processing node; and otherwise, insert in the first task a data access operation supplied by the EDT platform, for accessing the first data block from the second processing node. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, for facilitating data access by a task to be executed by one of several processing nodes in an event-driven task (EDT) platform. The instructions configure the processing unit as a compiler programmed to: identify a first data object used by a first task that is derived from source code of a program and that is executable on a first processing node of the EDT platform. A data object, as read/written by a task can be: (i) a data block; (ii) a portion of a data block; (iii) a combination of two or more data blocks; or (ii) a combination of portions of two or more data blocks.

The processing unit configured as a compiler is also programmed to identify a first data block associated with the first data object, the first data block being stored at a second processing node. In some cases, the second node is the same as the first node; in general they are different. The processing unit is further programmed to compute a data access parameter corresponding to the first data object; and if the data access parameter is at least equal to a specified threshold, insert in the first task a customized data access operation, for accessing the first data block via a local copy thereof at the first processing node; and otherwise, insert in the first task a data access operation supplied by the EDT platform, for accessing the first data block from the second processing node. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIGS. 3A-3C illustrate a manner in which a compiler can define data blocks, according to some embodiments;

FIG. 6 shows operations a compiler may provide for managing data blocks, according to one embodiment.

DETAILED DESCRIPTION

Figure 1:
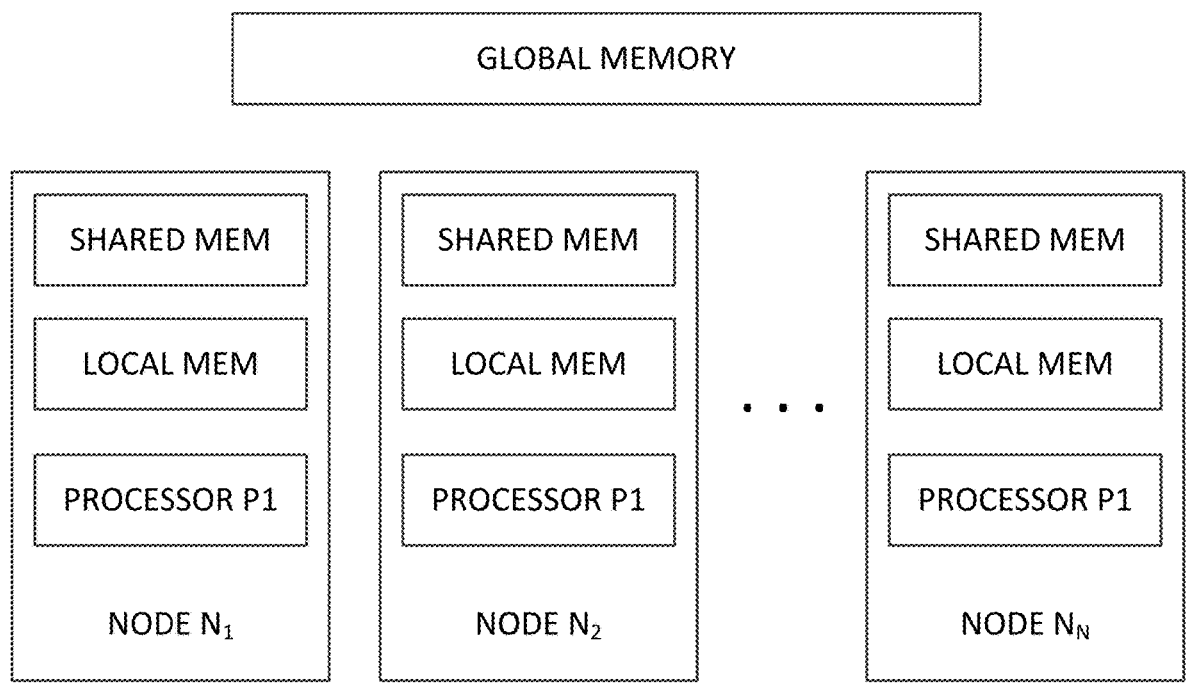
FIG. 1 schematically depicts an example EDT runtime/platform.

With reference to FIG. 1, a typical EDT runtime (also called EDT platform) includes several processing nodes. In general, an EDT platform may include tens, hundreds, or even thousands of nodes. Each processing node generally includes a processor or a core and a local memory. The processor can be a general purpose processor, a vector or graphics processor and the node may also include one or more co-processors. The local memory may be organized as a memory hierarchy having two or more hierarchies such as Level 1 cache, Level 2 cache, private local memory, shared local memory. The entire local memory at a node or portions thereof may be shared with one, some, or all of other nodes. The EDT platform may also include a global memory accessible by all processing nodes. The types and/or numbers of processors and/or memory structures at different nodes can be different.

An EDT runtime/platform executes tasks, i.e., sequences of operations. The execution of different tasks is not explicitly synchronized; they execute asynchronously. Specifically, the EDT runtime/platform can initiate the execution of any task at any node one all the predecessor tasks of the task to be executed have completed their respective executions, and the data required by the task to be executed has become available. The tasks run in a non-blocking manner. Once the task begins to execute, its generally runs to its completion. The EDT runtime/platform manager, a programmed processor, distributes the tasks to different nodes for execution. The data used by each task, i.e., data read and/or written by a task, is supplied to the task in the form of data blocks. The data blocks are distributed across some or all of the processing nodes and are generally maintained in the respective memory units at the different nodes.

The asynchronous execution model of the EDT runtimes/platform allows for concurrent execution of tasks, allowing for faster execution of computationally intensive programs. To this end, a compiler must parallelize the program code into different code portions that can be executed in parallel. While a programmer can also write parallelized code, in general this is not practical when several (e.g., tens, hundreds, or more) processing nodes are available for concurrent execution of program portions; a parallelizing compiler must generally be used. For execution on EDT platforms, the compiler must additionally derive several tasks (i.e., sequences of operations) from the program specification/source code. It is also beneficial for the compiler to define the data blocks to be used by these tasks, as further discussed below.

Figure 2:
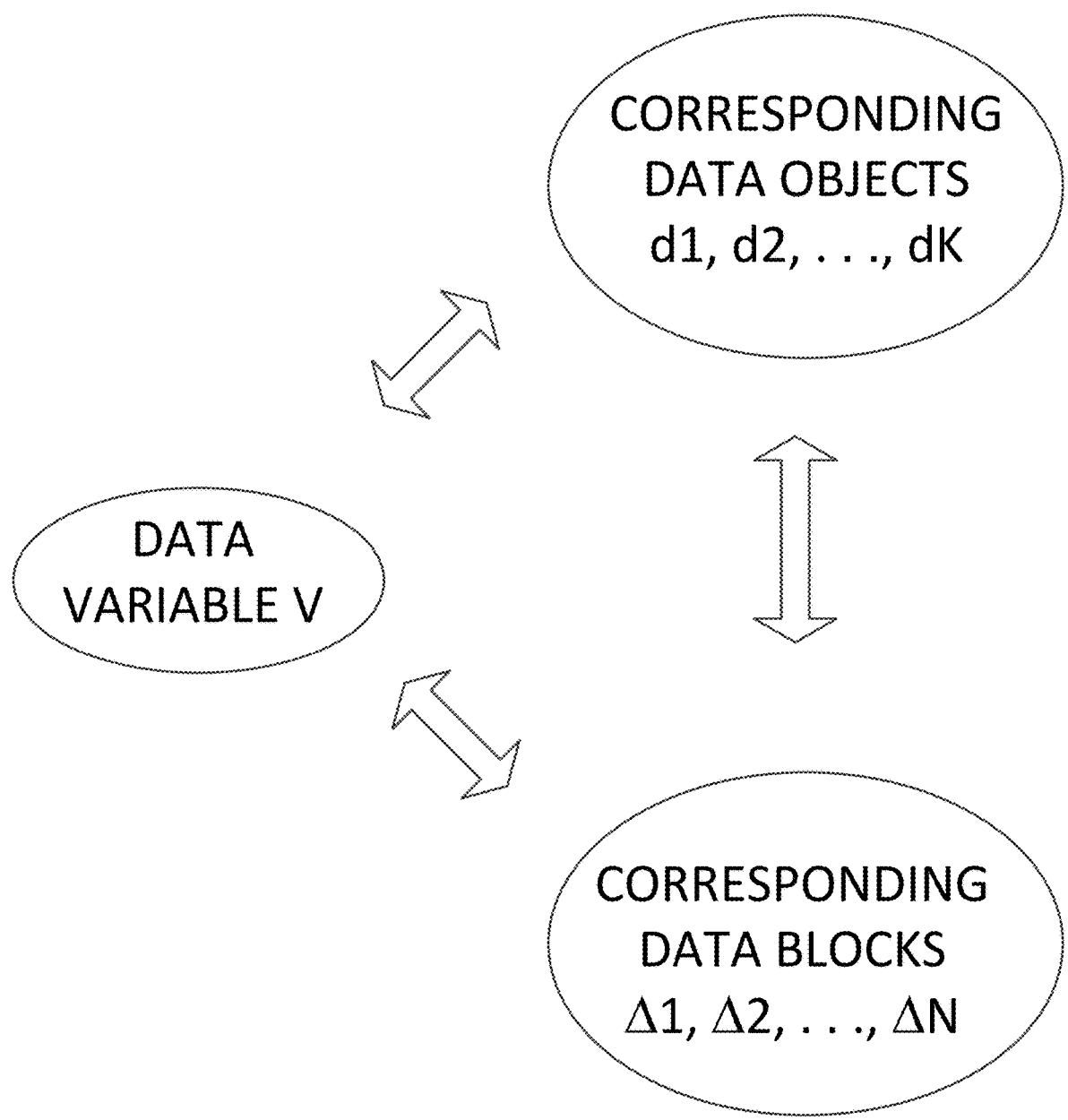
FIG. 2 schematically depicts a relationship between data variables, corresponding data objects used by a task, and corresponding data blocks managed by an EDT runtime/platform.

With reference to FIG. 2, a typical program includes declarations of data variables V1, V2, V3, etc. The data variables can be scalars (single values) such as integers, real (floating point) numbers, characters, etc. Often, however, the data variables are arrays including one, two, and multi-dimensional arrays. Two-dimensional arrays are sometimes referred to as matrices and multi-dimensional arrays are sometime calls tensors. Tensors can have 3, 5, 10, 20, or even more dimensions, and tensors (and any array in general) can be dense or sparse. The arrays may hold relatively simpler data elements such as integers, floating-point numbers, characters, strings, etc., or may hold large and complex, custom, programmer-defined data structures.

An EDT runtime/platform generally stores a large array not at a single processing node but across several or even all of the processing nodes. This way, the memory at a particular node is not oveutilized while under utilizing the memory at other nodes. Also, the total size of some arrays can be so large (e.g., tens or hundreds of megabytes, a few, tens, or hundreds of gigabytes, or even more) that the memory at any one processing node is not sufficient to hold that entire array. In order to distribute the data elements associated with a data variable, those data elements are generally partitioned into several (e.g., 4, 8, tens, hundreds, thousands, or even more) data blocks (denoted $\Delta_k$). A data block stored at Node k may be denoted $\Delta_k$. Different data blocks are associated with different data variables. Not all processing nodes necessarily have a data block or a data block corresponding to a particular variable.

A parallelizing compiler generally divides up the operations defined by a programmer in the program into several tasks, so that a group of tasks can be executed by the EDT runtime/platform concurrently or an in overlapping manner. To this end, the platform distributes different tasks across different processing nodes. A task may depend on other tasks and a dependent task cannot be executed until all of its predecessor tasks have executed. Several tasks may use the same data variable, but each of these tasks may only use (i.e., read and/or write) a different portion of the data variable. For example, if an array A has 128 elements indexed [0:127], the first two of eight tasks using the data variable A may use elements A[0:15]; A[16:31]; the last two of these eight tasks may use the data elements A[96:111] and A[112:127]. In some cases, parallelization of tasks may become possible, at least in part, because different tasks using the same variable use distinct portions of that variable. We refer to the portion of a data variable that is used by a task a data object, denoted d.

Consider an ideal situation, where there are L tasks that use elements of a data variable V and the L tasks are distributed across L processing nodes where a node $N_l$ is assigned to execute task $T_l$. Further assume that the variable V is partitioned into L data blocks $\{\Delta_1, \Delta_2, \ldots, \Delta_L\}$, where a data block $\Delta_l$ is stored at node $N_l$. Also assume that each task $T_l$ uses a data object $d_l$ that is identical to the data block $\Delta_l$. In this ideal situation, each task $T_l$ would have the exact data it needs $d_l$ available locally at the node $N_l$ where the task would execute in the form of the data object $\Delta_l$.

This ideal situation is rarely, if ever, true. In general, at least some of the data elements (if not all the data elements elements) of a data object used by a task are included in one or more data blocks that are not stored at the processing node at which the task would execute. Also, the data objects and data blocks may not align perfectly; they may have different sizes and even if the sizes are the same, the data elements included in a data block may only partially overlap with those included in a data object. As such, before a task begins its execution, all the data blocks the task requires generally need to be identified and acquired. In general, the data elements included in a data object may be included in a single data block or may be located on several data blocks. In general, the EDT runtime/platform maintains a mapping between a data variable and its corresponding data objects, as used by one or more tasks, and corresponding data blocks that may be stored across different nodes.

Generating at Compile Time Instructions for Runtime Creation and Deletion of Data Blocks Our approach to automatic creation of EDTs and EDT dependences involves advanced program analysis and transformation. Specifically, our approach involves the following compiler phases/steps:

Instance-wise dependence analysis with extensions to support encapsulated non-affine control-flow hidden within summary operations (a.k.a. blackboxes);

Scheduling to optimize a trade-off between parallelism, locality, and other metrics in the program;

Non-orthogonal tiling of imperfectly nested loops with a heuristic, which balances a model of data reuse, cache sizes and performance of streaming prefetches;

EDT formation from a tree representation of the tiled program;

Generation of dependences between EDTs; and

Code generation

Published R-Stream™ supports automatic generation of EDT code with on-the-fly scalable creation of task graphs (i.e., EDTs and EDT dependences). Creating all the EDTs at the beginning of the execution can lead to non-scalability and adds a significant (e.g., 0.5%, 1%, 2%, 5%, 10% etc., of the total execution time) "startup" time overhead. Published R-Stream™ can statically identify the set of EDTs that do not depend on any other EDT (i.e., EDTs that do not have a "predecessor" EDT) and can generate code to populate and spawn such EDTs at the beginning. Each EDT is generated with an additional piece of code that embeds the necessary dependence information to create its successors (if they are not created already) and to spawn them dynamically. This dynamic on-the-fly creation of EDTs and on-the-fly determination/generation of their dependences can be important for scalable execution of EDT code on a large number of cores (e.g., tens, hundreds, or even thousands of cores).

We now describe a new technique we implemented in R-Stream™ to avoid or minimize the sequential startup overhead in task spawning. The overhead arises primarily due to the absence of a viable way to statically determine a unique predecessor task for a successor task that has multiple predecessors. We implement a technique called "autodecs" that dynamically resolves this problem and does not introduce sequentializing dependences. We represent the number of unsatisfied input (control) dependences of a task using a "counted dependence" and we use polyhedral counting techniques to scan or enumerate the task dependence polyhedra to create the count. We let each predecessor of a task to decrement the count upon completion. The main idea of autodecs is that the first predecessor task to be able to decrement the counter of a successor task becomes the creator of the successor task. Unique creation of a counted dependence and hence a unique successor task creation is ensured through an atomic operation that avoids the race condition when two or more predecessors complete at the exact same time and become ready to create the same task.

Automatic Data Block Creation

As discussed above with reference to FIG. 2, in a typical EDT platform, the data blocks (DBs) are the units of storage. All user data needs to be in the form of DBs and needs to be controlled by the EDT platform because the platform can then relocate and replicate DBs for performance, power, or resilience reasons. The exact data movements induced by the platform are generally beyond the scope of characterization provided by a compiler. Nevertheless, an EDT runtime/platform, generally does not determine how to configure user data into data blocks and when to create and/or delete the data blocks. Typically, a programmer needs to provide this information to the EDT platform, which can be a challenge, leading to an inefficient usage of the EDT platform.

Specifically, as also discussed with reference to FIG. 2, a programmer generally lacks specific knowledge of how the data elements of data variables (D) should be mapped to one or more DBs ($\Delta$) and how one or more data objects (d) of one or more tasks, i.e., portions of the data elements of one or more data variables (or all of the data elements of a data variable in some cases), would be mapped to the one or more DBs. Therefore, a programmer typically cannot direct a runtime on how and when to create data blocks by taking into account information about characteristics of the EDT platform and/or the program to be compiled and executed. This can introduce inefficiencies in the usage of the EDT platform.

Various embodiments of a compiler discussed below provide such functionality. We have implemented this functionality in different versions of an improved R-Stream™ compiler and, for convenience, we refer to these improved versions as "Improved R-Stream." It should be understood that the implementation in Improved R-Stream is illustrative only and that the compile-time techniques described herein are not limited to Improved R-Stream. They can be implemented as part of any compiler used for compiling programs for execution on an EDT platform.

As a first step, Improved R-Stream identifies all scalar and array (i.e., one and multi-dimensional) variables specified in a program and creates one or more data blocks for each variable. When arrays are considered, they are often tiled rectangularly using user-defined sizes. The data tiles then become the internal representation for DBs. The compiler may also take into account a user specified block size. Optionally, the compiler may take into account one or more characteristics of the EDT platform such as the number of processing nodes in the EDT platform, and memory capacity at a processing node in the EDT platform. For example, the compiler may choose to distribute data blocks across all processing nodes, or across only a subset of the processing nodes and, as such, the size of a data block would be determined based on, at least in part, the size of the variable for which the data blocks are to be generated and the number of processing nodes to be used for the storage of those data blocks.

The compiler can also select the data block size based on the size of the memory at a particular processing node. In particular, the compiler may take into account the number of variables for which the data blocks are to be defined and the total size of those variables. If it is desired that at least one data block for each variable should be stored at each processing node, the size of the data block may be determined based on, at least in part, the number of variables for which the data blocks are to be defined, the total size of those variables, and the memory capacity of one or more processing nodes.

In some cases, the compiler may also take into account the usage of a data variable by the program or a task derived from the program. For example, the compiler may analyze one or more of: (i) an order of the dimensions of the data variable in which a task accesses the variable (e.g., whether rowwise or columnwise for a two-dimensional array), (ii) a tile size associated with the data variable, (iii) a number of data elements of the data variable that are used by the task, and (iv) contiguity (or stride) of the data elements of the data variable that are used by the task. This information may also be used in defining the data blocks, in order to improve the correspondence between the data objects used by tasks and the data blocks stored and provided by the EDT platform.

DB Origin Shift

It is frequent for a computation to only write in a part of the data. This happens for instance on stencil computations where elements at the boundary of the arrays are usually only read but not written. We exploit this common behavior to reduce the number of dependences from an EDT to DBs in an EDT platform.

It is important that EDTs depend on as few DBs as possible in order to minimize the runtime overhead and to reduce the number of dependences between EDTs. Reducing the number of dependences is particularly important when DBs are accessed in write mode because modifications have to be propagated and merged by the runtime which, in the worst cases, requires exclusive accesses to DBs, hence limiting the available parallelism. In various embodiments, Improved R-Stream can reduce the number of DBs an EDT depends on when only a part of the data is accessed. By analyzing one or more tasks, the compiler can determine which data elements of a variable are used for reading only and which data elements of the variable are used for writing, with or without reading. Separate data blocks may then be created for the data elements that are read only, and separate data blocks may be created for the data elements that are written. Different read only and write data blocks may have different sizes.

One particular strategy for separating the data blocks that may be written from those that may be read only is "origin shift." The "origin shift" compiler strategy shifts the origin of full data tile partitions to align it with data access patterns within computations, as shown in FIGS. 3A-3C. As a result, when the EDTs access a data block, the likelihood that two concurrent EDTs will depend on the same DB, and use it for write operations, is minimized. This can greatly improve the program performance as it is executed by the EDT platform.

Data Placement

When considering distributed execution of programs, placing the program data is one of the fundamental problem that must be solved in order to reach good performance. Even though an EDT platform abstracts away where (i.e., at which processing node) the computations associated with a task are performed, it is still important to correctly scatter the program data over several nodes to increase the likelihood that the computations (tasks) are performed where the data used by the computations (tasks) is located.

In some of our implementations, a thin runtime library is used as an interface between the compiler-generated programs and the EDT platform. That runtime library is in charge of the data placement. Therefore, whenever a new data block is to be created, e.g., when a data block is first touched, a platform hint is generated to make sure that the data block is placed on a relevant node. In some cases, in guiding distribution of data blocks, the compiler aims to follow a selected distribution strategy without specifically attempting to associate the data blocks with the tasks that may use the data blocks.

For example, in some embodiments, the position of the data block origin in the full data layout is used to determine where to locate the data block. To this end, a compiler selects a data variable specified in the source code of the program, and identifies all of the data blocks associated with the selected data variable. The compiler then determines the relative position of a data block in the corresponding data variable, and generates one or more EDT platform directives for distribution of the data blocks across all or some of the processing nodes of the EDT platform based on the respective relative position of each data block.

To illustrate, consider an array A[0:999], where the 1000 elements of the array are to be distributed across 5 processing nodes. In one case, each data block may include 200 elements and, as such, the position of the data block A[0:199] in the array A is "1." Therefore, in one case, a directive is generated to locate the data block A[0:199] at Node N1. Note, the directive can suggest locating this data block at any other node. The relative position of the data block A[600:799] in the array A is "4" and, as such, a directive is generated to locate the data block A[0:199] at Node N4.

The directive may also be based on a specified manner of data block distribution, described as a strategy. Examples of strategies include:

round-robin: every data block is allocated on a different node than its neighbors;

block: all the data blocks are divided in as many contiguous sets as there are nodes and every nodes hosts one of those sets;

block-cyclic: the data blocks are divided in small blocks that are cyclically assigned to the nodes in a round-robin fashion; and automatic: the runtime decides where to allocate the new data block.

To illustrate using the example above, in another case, each data block may include 100 elements, and the distribution strategy may be "round-robin." In this case, the position of the data block A[0:99] in the array A is "1;" the position of the data block A[400:499] is "5;" and the position of the data block A[600:699] is 7. Therefore, according to the "round-robin" strategy starting with node N1, directive(s) may be generated to place the data blocks A[0:99], A[400:499], and A[600:699] at processing nodes N1, N5, and N2, respectively, of the EDT platform. In another case, according to the "block" strategy, where two contiguous blocks are placed at each node starting with node N3, directive(s) may be generated to place the data blocks A[0:99], A[400:499], and A[600:699] at processing nodes N3, N5, and N1, respectively, of the EDT platform.

Runtime Hints

In some embodiments, the compiler attempts to co-locate the EDTs with the relevant DBs. In particular, the compiler automatically generates EDT platform hints to provide information regarding EDT and DB affinities and information about the data access and communication patterns to the runtime. It is ultimately up to the runtime/platform to make the best use of the hints provided by the compiler. One of the EDT platform hints that an embodiment of Improved R-Stream generates is the hint to specify the data block that has the highest affinity with respect to a task (an explicit affinity hint between one task and one block of data). Such a hint allows the runtime to co-locate each task with its frequently accessed data block and thereby improve the program performance.

In some embodiments of Improved R-Stream compiler, we implemented two strategies to generate data affinity hints in programs generated by the compiler: one more precise and expensive, and the other reasonably approximate and less expensive. Ideally, the exact amount of data accessed by every EDT, combined with the reuse information, defines the best DB to co-locate with the EDT. However, in practice, it is often computationally expensive to compute this quantity, although some embodiments of R Stream have this capability. The first strategy in Improved R-Stream provides data affinity hints through an expensive computation that expresses the volume of data as a potentially complex "Ehrhart polynomial" that is costly to instantiate at runtime.

The second strategy uses a simple but effective heuristic to select a good DB to associate with each EDT. Depending on the computation, DBs may be either fully (all data elements within the DB) or partially accessed by an EDT. For instance, a stencil computation accesses a full DB plus some border elements stored in neighboring DBs. It is much less computationally expensive to determine the set of DBs accessed by an EDT than it is to compute the exact volume of data accessed by the EDT. Hence, in some embodiments, Improved R-Stream determines the set of partially and fully accessed DBs for every EDT. Finally, to associate a DB to an EDT, Improved R-Stream ranks the DBs accessed by the EDT based on the following criteria (in that order):
  partially or fully accessed;
  read or write access mode: EDTs should better be co-located with the DBs they modify in order to reduce the cost of data management;
  reuse factor: EDTs should better be co-located with the data blocks they access more frequently.

In some embodiments, Improved R-Stream associates one DB to an EDT based on the ordering of the DB s, which can results in performing the computations closer to the relevant data in the cluster of processing nodes.

Once the compiler determines how to create the data blocks, i.e., determines one or more of: (i) the size(s) of data blocks, (ii) shapes of data blocks, e.g., in terms of dimensions of a multi-dimensional data variable in the program, where those dimensions are to be used in forming the data blocks, (iii) groups of elements of the data variable that would be included in the respective data blocks, etc., and may have optionally determined where the data blocks should be placed, the compiler generates instructions for creating the data blocks and/or for guiding their placement, and includes these instructions in the specified program to produce a modified program. The modified program may be compiled further to obtain an executable program or the modified program itself may be executable. When the EDT runtime/platform would execute the modified program, the platform would create at runtime the data blocks as determined and specified by the compiler at compile time. In this, the compiler has generally used the physical characteristics of the EDT runtime/platform, and may have analyzed the program/tasks to be executed, to improve the performance of the EDT platform in terms of speed, memory usage, and/or energy and/or power consumption.

Guiding at Compile Time the Runtime Creation and Deletion of Data Blocks

As discussed above, various embodiments of a compiler described herein can improve the kinds of data blocks that are created and/or their placement in the context of the EDTs using these data blocks. EDT platforms typically create all the specified data blocks at the beginning, when the program execution begins. Not all data blocks are needed by all tasks, and not all data blocks are needed as soon as the program execution starts, however. The typical default behavior in which all data blocks may be created as soon as the program execution starts, thus may incur a significant start up overhead. For example, up to 0.5%, 1%, 2%, 5%, or even more of the total program execution time may be spent during start up.

Some embodiments of the compiler described herein delay the runtime creation of a data block until it is needed by a task for the execution thereof. Some embodiments delay the creation not necessarily till the latest time at which the data block must be created, but to a time later than the beginning of the execution of the program. Both techniques can minimize the start up overhead; the first technique guarantees just-in-time creation of the data blocks and the second technique allows some flexibility to the runtime.

With reference to FIGS. 4A-4D, tasks UT1, UT2, and UT3 use a particular data block. Tasks IT1 and IT2 are some of the initial tasks that do not have any predecessors and may be executed as soon as the execution of the program begins. Tasks OT1, OT2, and OT3 are other tasks that are not related to (i.e., not predecessor or successor of) tasks UT1, UT2, or UT3. Tasks PT3, PT5, PT6, and PT7 are immediate predecessors of tasks UT1-UT3, and tasks PT1, PT2, and PT4 are additional predecessors of tasks UT1-UT3. The predecessors of tasks PT1, PT2, and PT4 are not shown for convenience, but those predecessors, their predecessors, their predecessors' predecessors, are all members of a comprehensive set of predecessors of tasks UT1-UT3.

Figure 4A:
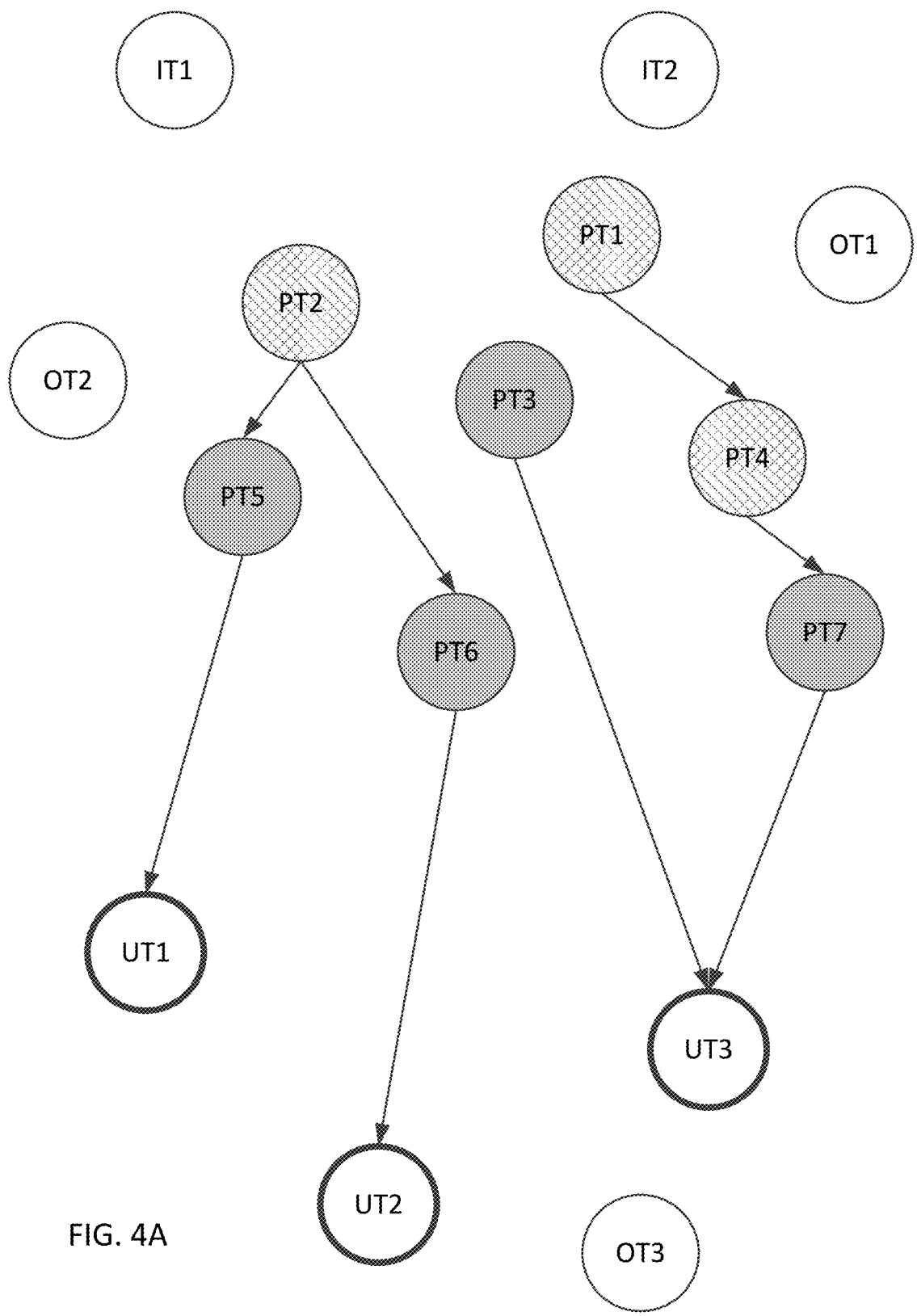
FIGS. 4A-4D depict creation of a data block according to one embodiment.
Figure 4B:
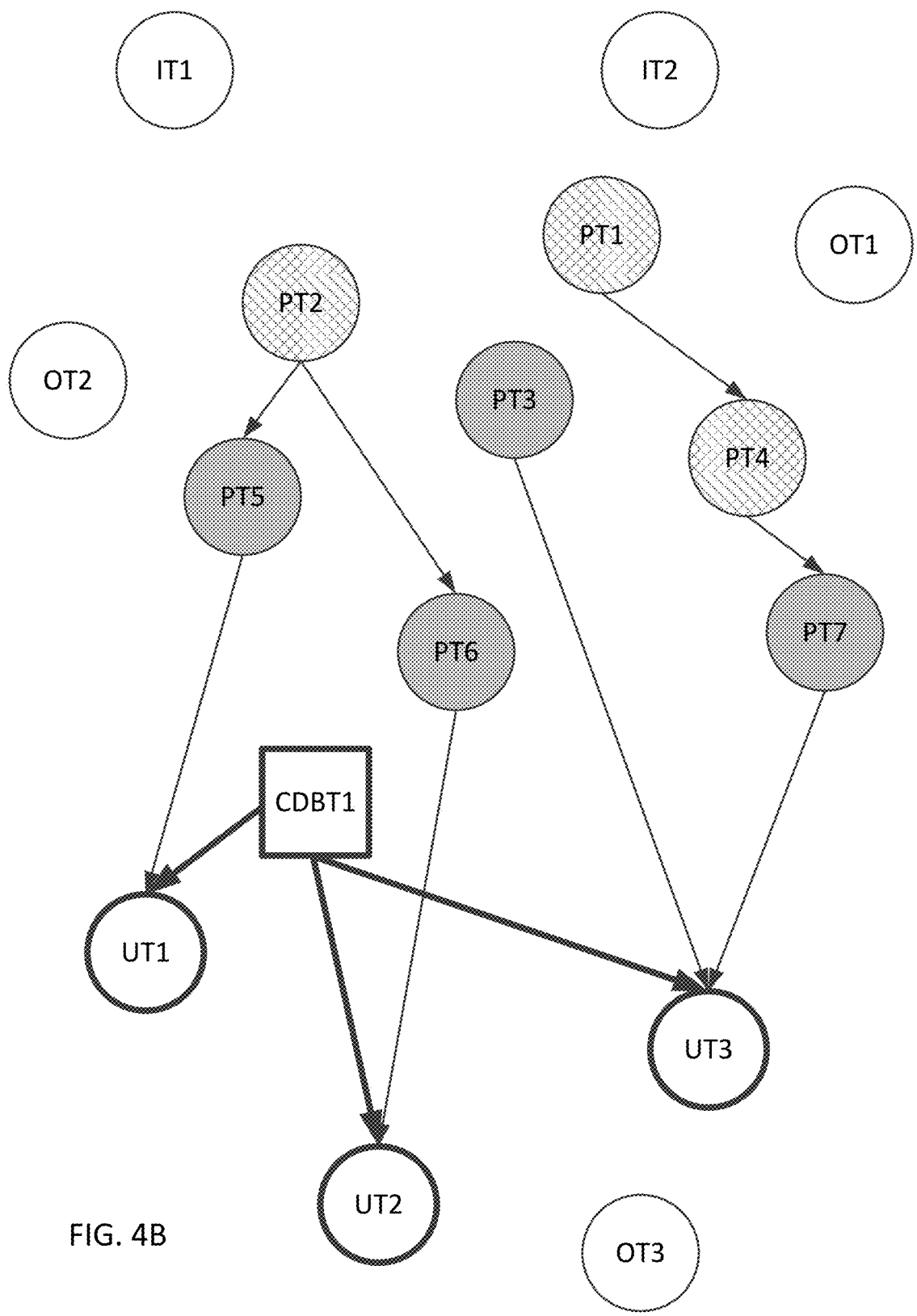

Task CDBT1 creates the data block used by tasks UT1-UT3. Before any of UT1, UT2, and UT3 can execute, that data block must be created and, as such, task CDBT1 must be executed before any of tasks UT1-UT3 are executed. Some embodiments of Improved R-Stream can achieve this by making task CDBT1 a predecessor to each of tasks UT1-UT3. While this can guarantee correctness, this does not guarantee that the data block will not be created at the start of the execution of the program. The reason is, as FIG. 4B shows, task CDBT1 does not have any predecessors, so the EDT platform can schedule its execution anytime, including at the start of execution of the program.

Figure 4C:
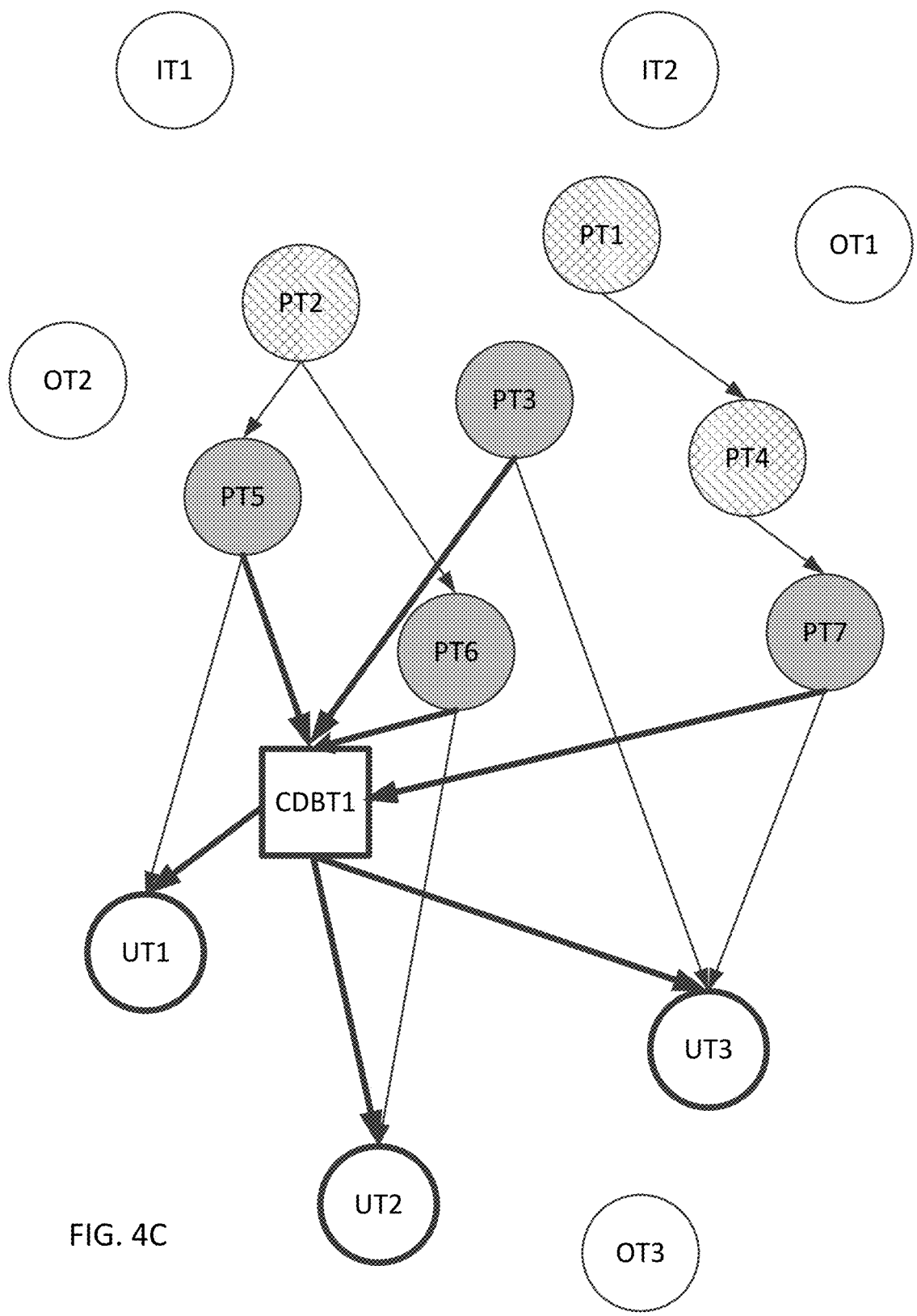

In general, the data block used by UT1-UT3 need not be created until at least one of UT1, UT2, and UT3 is ready to run. Creating this data block only when at least one of UT1-UT3 is ready to run would delay the creation of that data block as much as possible, which can improve the performance of the EDT platform, e.g., by spreading out the processing load of creating data blocks and/or by minimizing the overall memory load of the platform. Therefore, task CDBT1 need not be scheduled to execute until at least one of UT1, UT2, and UT3 is ready to run. This can be achieved, without creating significant unnecessary dependencies, by making task CDBT1 dependent from all immediate predecessors of tasks UT1-UT3, i.e., tasks PT3, PT5, PT6, and PT7, as FIG. 4C shows.

Figure 4D:
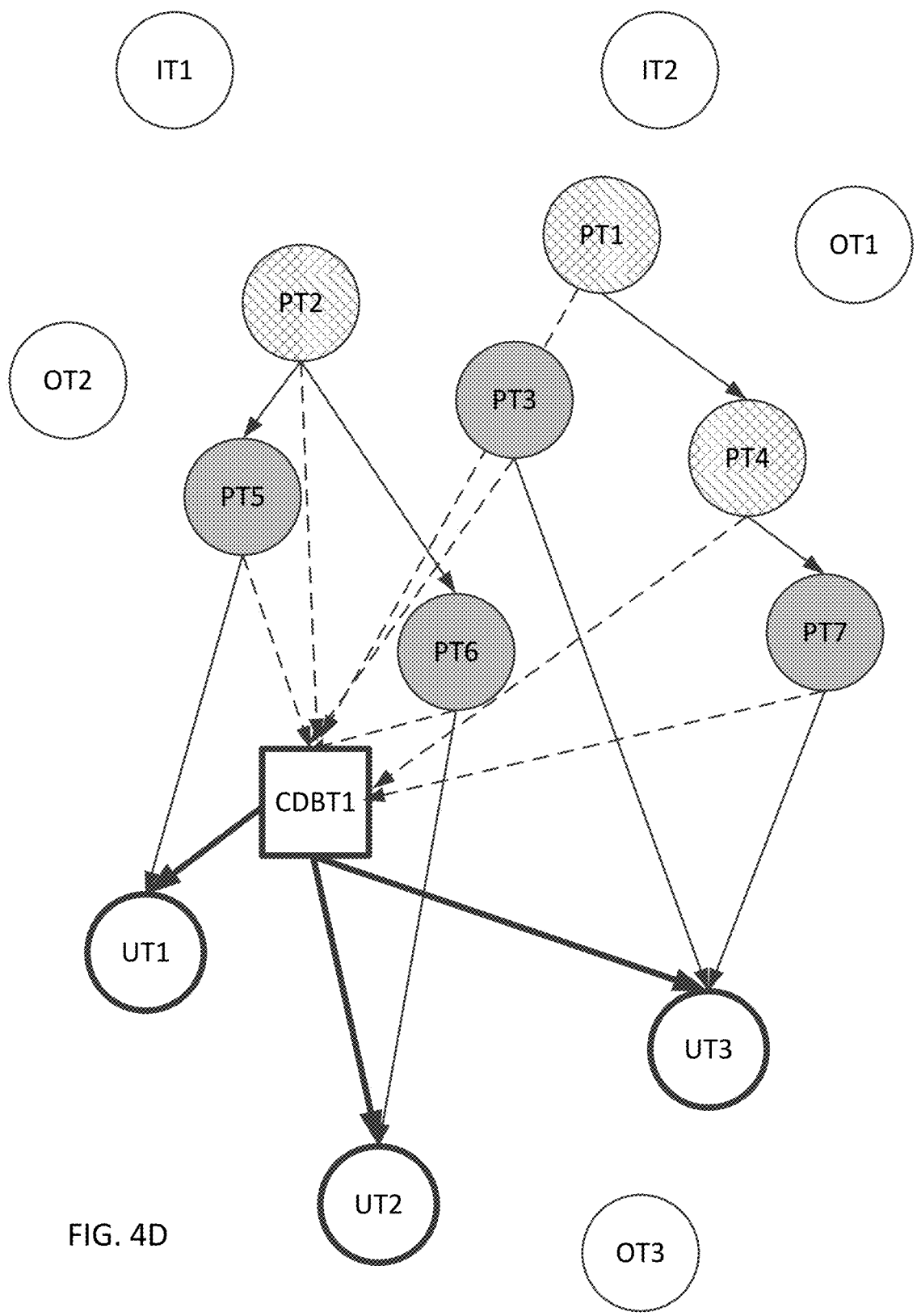

While this can ensure that the creation of the data block used by UT1-UT3 is delayed as much as possible, this may be overly restrictive and may not be optimal for improving performance of the EDT platform. In particular, under the configuration described above, none of tasks UT1-UT3 can be executed until they all are ready for execution. This restriction can be relaxed by making CDBT1 dependent on one or more, but not all, of the immediate predecessors of UT1-UT3, i.e., tasks PT3, PT5, PT6, and PT7. The restriction can be relaxed further by making CDBT1 dependent on one or more, but not all, of the comprehensive set of all predecessors of UT1-UT3, i.e., PT1-PT7 (as FIG. 4D shows) and their predecessors, their predecessors, and so on. Thus, task CDBT1 may not run immediately after the start of execution of the program and also may not run at the latest time at which it must run, but at some intermediate time.

In the discussion above, we assume for convenience of discussion that the predecessors of UT1-UT3 do not themselves use the data block created by task CDBT1. If any predecessor does use that data block, that predecessor would be excluded from the set of immediate predecessors and/or form the comprehensive set of predecessors. It should be understood that the number of nodes of different types that are considered in this discussion are illustrative only.

Generally, an EDT runtime may delete all the data blocks that were created at or near the end of the execution of the program, causing the memory load of the platform to remain high once all data blocks are created. Similar to just-in-time or delayed creation of data blocks described above, some embodiments of the compiler described herein advance the runtime deletion of a data block as soon as it is no longer needed by any task. To that end, these embodiments of the compiler specify a data-block-deletion task for each data block, where the compiler configures the deletion task for a data block to execute as soon as all tasks using that data block have completed their respective execution. Some embodiments advance the deletion not necessarily to the earliest time at which the data block can be deleted, but to a time earlier than the end of the execution of the program. Both techniques can minimize the memory load of the EDT platform; the first technique guarantees as-soon-as possible deletion of the data blocks and the second technique allows some flexibility to the runtime.

With reference to FIGS. 5A-5D, tasks UT1, UT2, and UT3 use a particular data block. Tasks IT1 and IT2 are some of the initial tasks that do not have any predecessors and may be executed as soon as the execution of the program begins. Tasks OT1, OT2, and OT3 are other tasks that are not related to (i.e., not predecessor or successor of) tasks UT1, UT2, or UT3. Tasks ST1-ST3 are immediate successors of tasks UT1-UT3, and tasks ST4-ST6 are additional successors of tasks UT1-UT3. The successors of tasks ST1-ST4 are not shown for convenience, but those successors, their successors, their successors' successors, are all members of a comprehensive set of successors of tasks UT1-UT3.

Figure 5A:
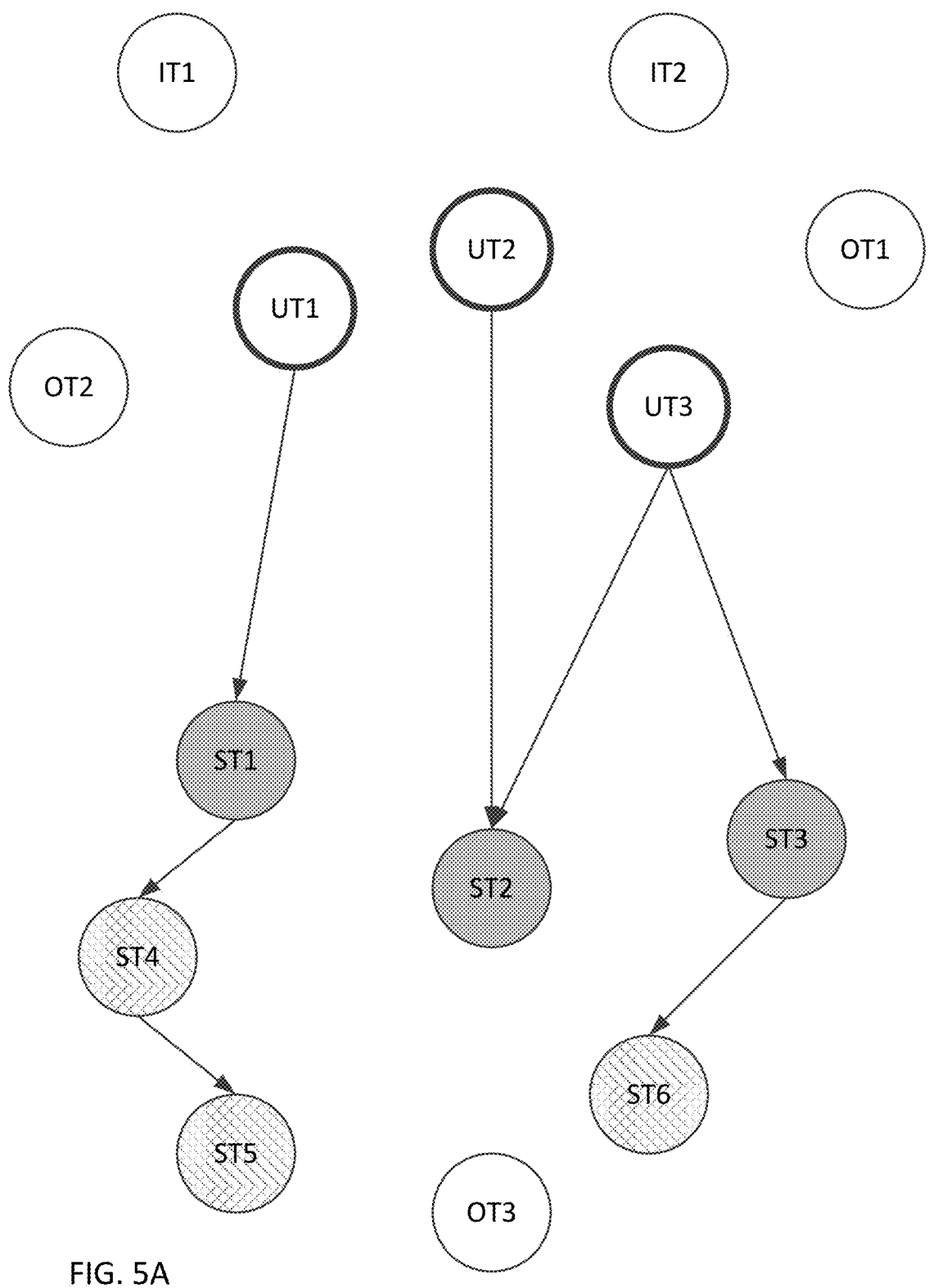
FIGS. 5A-5D depict deletion of a data block according to one embodiment.
Figure 5B:
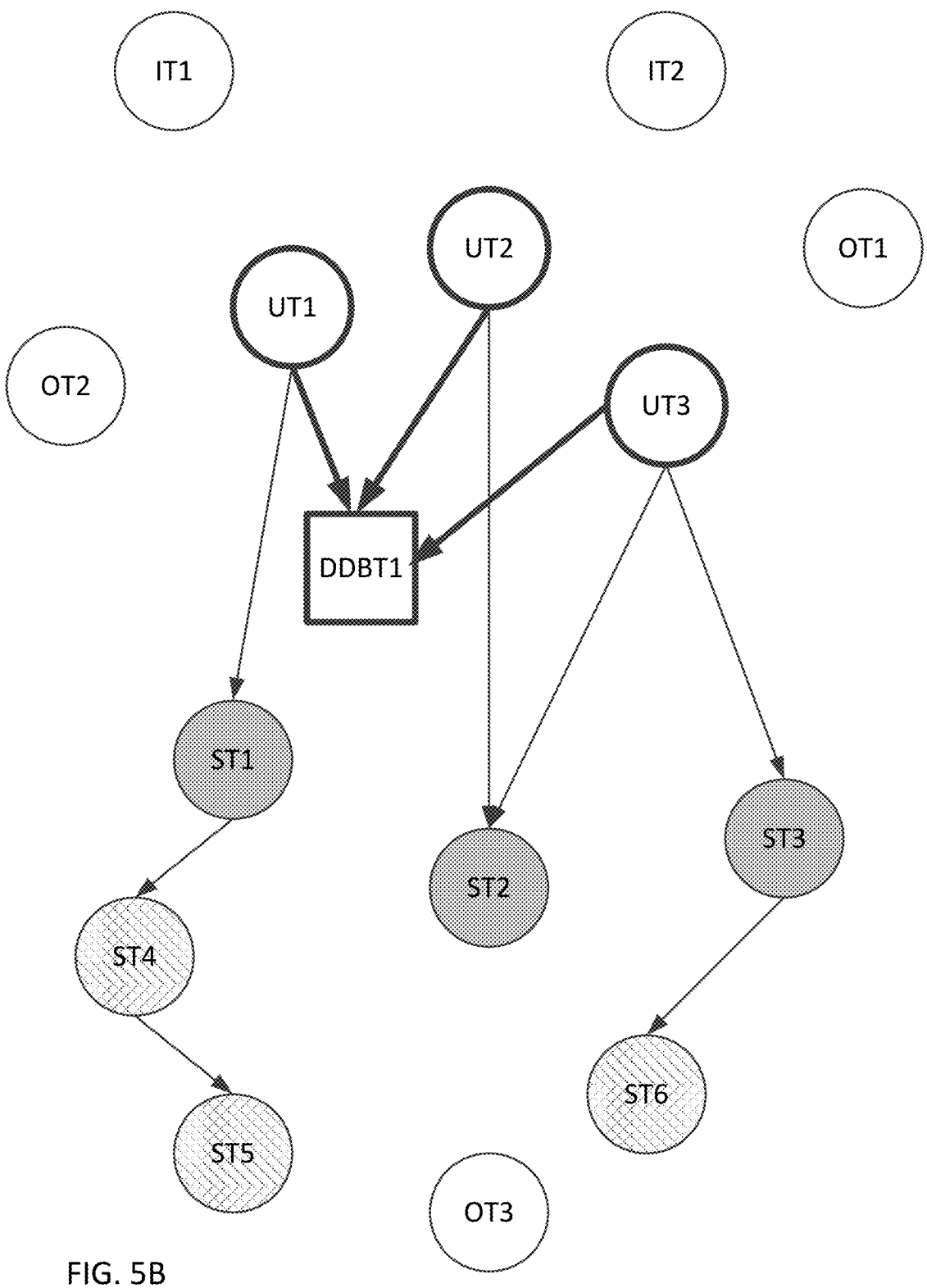

Task DDBT1 deletes the data block used by tasks UT1-UT3. That data block can be deleted only after each of UT1, UT2, and UT3 has completed its execution, and, as such, task DDBT1 must not be executed before all tasks UT1-UT3 are completed. Some embodiments of Improved R-Stream can achieve this by making task DDBT1 a successor to each of tasks UT1-UT3. While this can guarantee correctness, this does not guarantee that the data block will not be deleted as soon as it is no longer needed, i.e., not used by any task. The reason is, as FIG. 5B shows, task DDBT1 does not have any successors, so the EDT platform can schedule its execution anytime, including at the end of execution of the program.

Figure 5C:
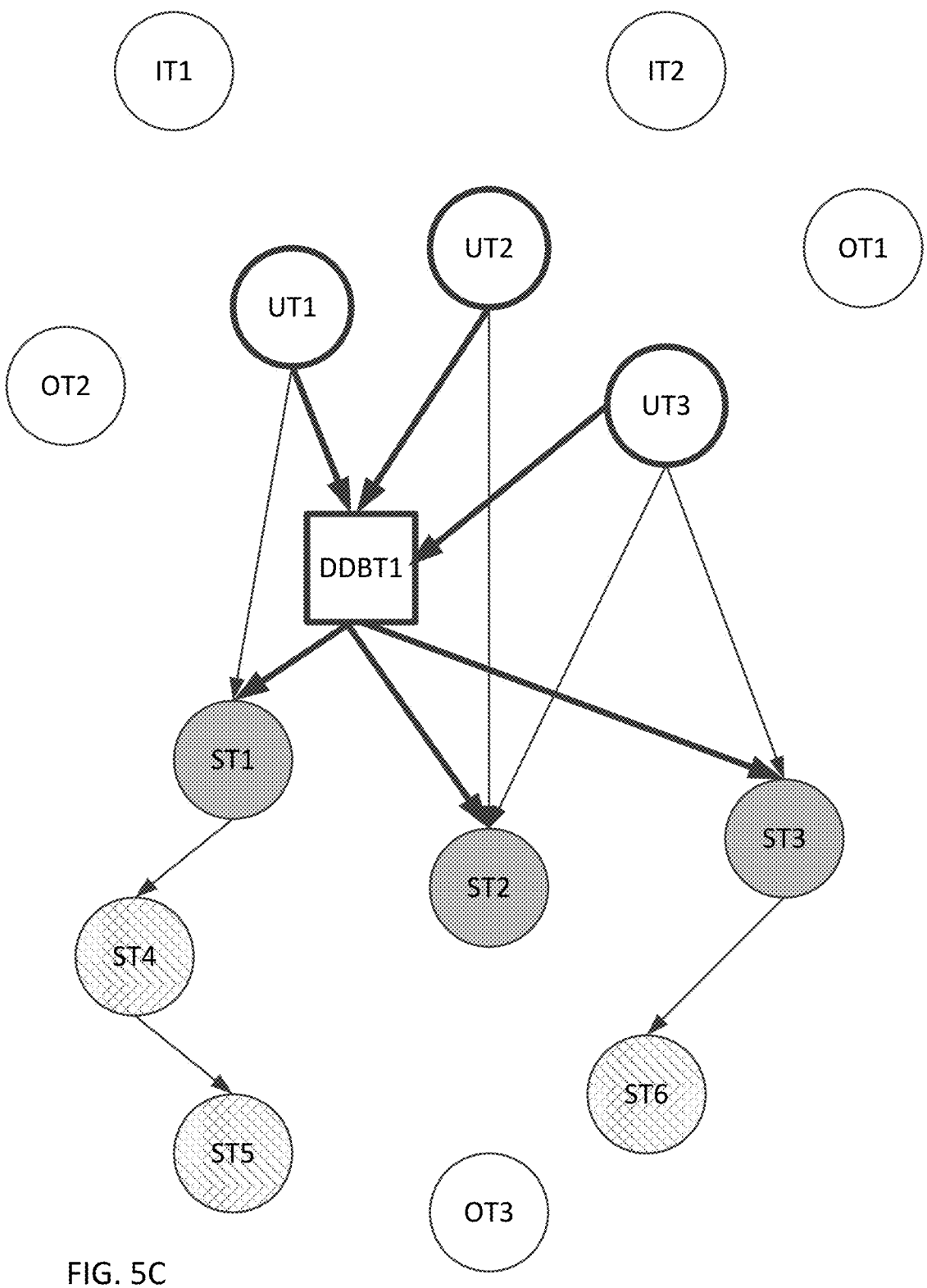

In general, the data block used by UT1-UT3 can be deleted immediately after all of UT1, UT2, and UT3 have run. Deleting this data block immediately after all of UT1-UT3 are executed would cause the deletion of that data block as early as possible, which can improve the performance of the EDT platform, e.g., by spreading out the processing load of deleting data blocks and/or by minimizing the overall memory load of the platform. Therefore, task DDBT1 may be scheduled to execute immediately after all of UT1, UT2, and UT3 have run. This can be achieved, without creating significant unnecessary dependencies, by making task DDBT1 a predecessor to all immediate successors of tasks UT1-UT3, i.e., tasks ST1-ST3, as FIG. 5C shows.

Figure 5D:
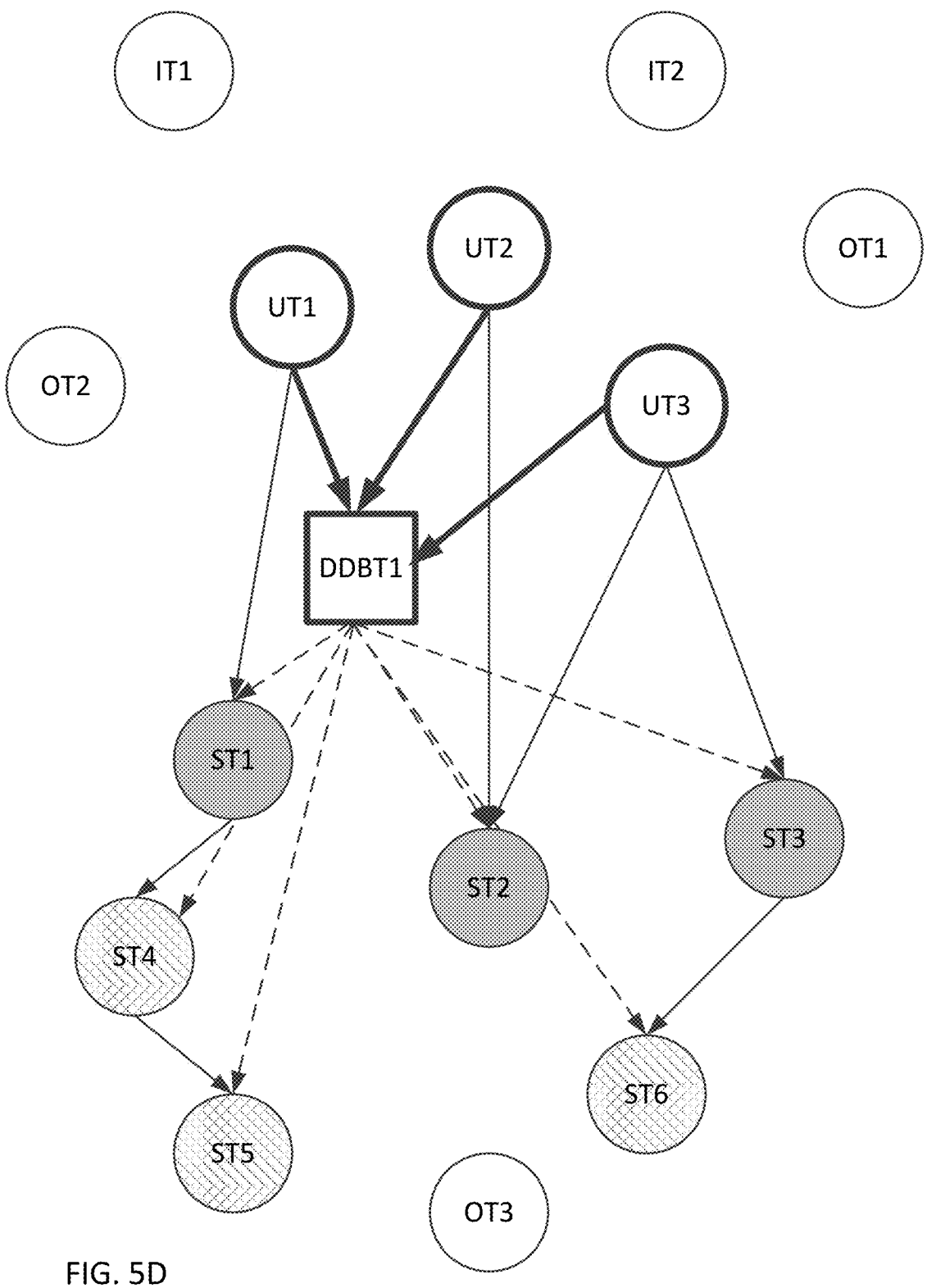

While this can ensure that the deletion of the data block used by UT1-UT3 is advanced as much as possible, this may be overly restrictive and may not be optimal for improving performance of the EDT platform. In particular, under the configuration described above, none of the successors UT1-UT3 can be executed until the data block is deleted. This restriction can be relaxed by making DDBT1 a predecessor to one or more, but not all, of the immediate successors of UT1-UT3, i.e., tasks ST1-ST3. The restriction can be relaxed further by making DDBT1 a predecessor to one or more, but not all, of the comprehensive set of all successors of UT1-UT3, i.e., ST1-ST6 (as FIG. 5D shows) and their successors, their successors, and so on. Thus, task DDBT1 may not run immediately after the completion of tasks UT1-UT3 and also may not run at the end of execution of the program, but at some intermediate time.

In the discussion above, we assume for convenience of discussion that the successors of UT1-UT3 do not themselves use the data block deleted by task DDBT1. If any successor does use that data block, that successor would be excluded from the set of immediate successors and/or form the comprehensive set of successors. It should be understood that the number of nodes of different types that are considered in this discussion are illustrative only.

Configuring at Compiler Time how Tasks May Access Data Blocks at Runtime

As an additional constraint imposed by many EDT platforms, DBs have to be acquired by EDTs and a DB acquisition can only happen at two distinct times:
- when a new DB is created, it can be acquired by the EDT creating it;
- when a new EDT is created, it can declare a list of DBs which will be acquired whenever the EDT starts.

As a result, the data management in EDT programs in nontrivial (i.e., requiring analysis of the program and/or tasks), and is often unmanageable for programmers.

Using the polyhedral model, some embodiments of a compiler described herein can deduce which DBs will be accessed by a given computation/task. It is then possible to associate EDTs to DBs in the program by such embodiments of the compiler. In order to provide an efficient data management under the constraints imposed by the EDT platform, in one embodiment, the compiler generated three distinct operations in order to turn the computation performed in an EDT into computations performed over the relevant data blocks:

DBEnumerate: this operation fills a data structure with the identifiers of all the data blocks that will be needed by an EDT. The operation is run once, when a new EDT is created and helps determining the data blocks it must acquire.

DBFetchDirect: finds one specific DB among the DBs acquired by an EDT, based on its identifier. The operator provides a data pointer to the data block content.

DBFetchCopy: also finds one specific DB among the DBs acquired by an EDT based on its identifier. The difference with the previous operator is that the data pointer returned is not directly backed by the data block content but by a buffer into which a part of the data block content has been copied.

The first operator, DBEnumerate is generally relevant only when creating an EDT, while the other two operators can be used during the computation, i.e., during the execution of the task, to make sure that the relevant data is accessed, as illustrated in FIG. 6.

DB Enumeration

In order to determine which DBs are relevant for a particular EDT, an embodiment of a compiler uses the classical dependence analysis tools provided by the polyhedral model. In particular, EDT to DB dependences are represented as dependences between tiles of iterations and tiles of data, linked by the memory access function. In the polyhedral model, dependences are represented using polyhedra and there exist methods to generate a loop nest enumerating the dependences. Thus, the dependences between every EDT and the accessed DBs can be represented internally using a few polyhedral, and those polyhedra can be turned into program statements, e.g., C enumeration functions, during code generation. The generated statements/functions take as a parameter the identifier for a particular EDT and fill a structure with the identifier of all the DBs that will be accessed by the EDT. Finally, when DBEnumerate is invoked for a successor EDT, it simply calls the relevant enumeration function using relevant parameters, and acquires all the data blocks that are required by the EDT. Acquisition of the data blocks is performed by the EDT platform.

DB Fetching

We presented earlier two distinct operators that can be used to retrieve a data pointer either in a DB or in a buffer initialized from a DB. We detail below the differences between the two operators.

DBFetchDirect is a relatively simple DB fetching operator. It simply finds the relevant DB among the acquired ones and returns a pointer to the content of the data block. Data access using this operator can be fast but, but this operator relies on the DB location functionality provided by the EDT platform. Specifically, the data elements used by an EDT are specified in the program in terms of a corresponding data variable specified in the program, such as, e.g., A[126][83] [9]. This particular data element would be in a specific data bock, e.g., data block 57 that is associated with the data variable A. Moreover, the required data element may be the $53^{rd}$ element in the $57^{th}$ data block. The runtime can and needs to make this determination, i.e., the mapping between the required data element as needed by the task (according to the program specification) and storage of that data element in the corresponding data block. This mapping can be slow and/or may require additional computation resources and, as such, may not perform well, especially when the computation repeatedly accesses at least a subset of the DB content. A typical performance issue appears when the data block carries a multidimensional array that is accessed only partially in the computation. In such cases, the memory accesses performed are likely to exhibit a poor locality and the overall computation performance will be low, resulting from frequent cache misses.

In order to improve the performance of the computation (i.e., the execution of an EDT) in cases where cache locality is low and data reuse is high, an embodiment of a compiler exploits its advanced memory management capabilities to copy first the content of the DB relevant to the computation/EDT in a buffer. During the copy, some data layout transformations can be applied to improve the memory performance during the computation. This complex memory optimization is executed when the DBFetchCopy operator is used. This second operator also has a limitation: some data needs to be copied to or from the data block prior to the computation, which can be expensive. Once copied, however, access to the copy need not require reliance on functionality provided by the EDT platform and complex mapping operations involved in that access. The required address translation can be performed locally, by the processing node itself, allowing faster, efficient access to the required data elements.

In some embodiments, the compiler evaluates every memory access performed in the computation to determine which of the two fetching operators should be used. More specifically, the data reuse rate of every reference is evaluated and the optimizing fetch operator DBFetchCopy is used only when the computation has a high (e.g., at least equal to a specified threshold) data reuse rate. For the other memory references, calls to DBFetchDirect are generated and inserted in the program by the compiler. The threshold can be based on a statistical value based on the reuse factors of different data variables or data objects in the same task or across different tasks.

In some embodiments, the compiler determines at compile time the data reuse rate (also called a reuse factor), i.e., a data access parameter, by counting and using a number of accesses within a task to a data object. The compiler may also determining and use one or more of: a number of data elements in the corresponding data block, size of a data element in the corresponding data block, a number of data elements in the data object used by the task, and size of a data element in the data object. These parameter can affect the time required to copy one or more data blocks or respective portions thereof.

For example, consider a global array A[256] [256] stored as 16 data blocks AA[64][64] across 16 nodes. Suppose the data block $\Delta A_1$[1:64][1:64] is stored at node N1 and $\Delta A_2$ [1:64][65:128] is stored at node N2. Suppose a task at node N1 accesses a tile A[16:31][81:96]. The tile A[16:31][81:96] is the data object, which is part of the data block $\Delta A_2$ that is stored at node N2. Of the 4096 data elements of the data block $\Delta A_2$, only 256 elements are actually used. Depending on the loop nest within which A[16:31][81:96] are accessed, each element may be accessed only once, or may be several times. The reuse factor could depend on the number of times the elements of A[16:31][81:96] are accessed and may also depend on: (i) the size/number of elements of $\Delta A_2$, and/or (ii) size/number of elements of A[16:31][81:96].

In some cases, a compiler cannot determine data reuse factor at compile time and, as such, may determine a data access parameter by determining and using one or more of:

a number of data elements in a data block, size of a data element in a data block, a number of data elements in a data object, size of a data element in a data object, expected time to copy the data block, and expected time to construct the data object at a processing node. Here, the reuse factor cannot be determined at compile time, so the decision whether to copy the data block or a portion thereof may be based on one or more of the parameters identified above.

EXAMPLE

Consider an example code:

```
int  A[8][8]; B[8][8]; C[8][8];
for (i=1; i<=8; i++) {
   for (j=1; j<=8; j++  {
      C[i][j] = A[i][j] + B[j][i];
   }
}
```

Suppose matrices A, B, and C are distributed across eight processing nodes (N1-N8) of an EDT platform in a row-wise manner. So at each node k, we would have one-dimensional arrays A_1[1:8]=A[k][1:8]; B_1[1:8]=B[k][1:8]; and C_1[1:8]=C[k][1:8]. Also suppose that the computation of C is split into 8 tasks, each corresponding to one particular value of index "i" and are distributed across the processing nodes N1 through N8. For each task, the required data blocks of A and C would be available locally, but only one element of the required data block of B would be locally available; the other seven elements would be available at the other seven nodes. In general, for a node $N_k$, the operations would be:

```
for (m=1; m<=8; m++)  {
   C[k][m] = A[k][m] + B[m][k];
}
```

In this example, DBFetchDirect(C[k][m]) would simply provide C_1[m] and, similarly, DBFetchDirect(A[k][m]) would simply provide A_1[m]. When DBFetchDirect( ) is used, the EDT platform provides the functionality to determine that the required elements of C and A are available at Node $N_k$, and would also perform the required address translation, translating the specified address "[k][m]" into an index "[m]" that is associated with the data block.

If DBFetchDirect(B[m][k]) is used, the runtime functionality would be invoked again, and would need to determine that for m=k, B_1[m] can be used, but for m ≠ k, B_1[m] located at the m-th node must to be accessed. In this example, B[m][k] is accessed only once, so the overhead of identifying the required data block and performing the address translation may not be significant. Nevertheless, depending on how the EDT runtime/platform internally implements the access to the elements of the data blocks of B, a cache performance problem may occur at Node $N_k$. Specifically, in each iteration, the entire data block that contains the required B [m][k] may be copied (internally by the EDT platform) at Node $N_k$ even though, only one element of that block is needed by Node $N_k$.

An alternative would be to used DBFetchCopy(B[m][k]), which would create a local buffer at each node k such that B_buff[1:8]=B[1:8][k]. The copy functionality may be optimized to recognize that the task requires only one element (a smaller portion of the entire data block, in general), and copy only that element (the smaller portion, in general). This can decrease the memory usage at Node $N_k$, and can improve the cache hit ratio at each Node $N_k$. Such an improvement can be even more significant when certain data elements/data objects are reused in the task.

Now consider another example:

```
for (i = 0 to N)
   for (j = 0 to J)
      for (k = 0 to K)
         A[i][j][k] = B[i][j][k] + C[j][k]
```

Here again, if DBFetchDirect is used to access A[i][j][k], B[i][j][k], and C[i][j], in each of the N*J*K iterations, the EDT runtime/platform functionality would need to determine: (i) the nodes at which the required data blocks of A, B, and C are located, and (ii) translated the specified addresses/indices "[i][j][k]" of A and B and specified addresses/indices [j][k] of C into the corresponding addresses within the identified data blocks of A, B, and C, respectively. With respect to the data blocks of A and B, the overhead of using the EDT runtime/platform functionality is not significant because each address/index "[i][j][k]" is unique.

With respect to the data blocks of C, however, the address/index "[j][k]" is not unique for each set of N iterations. Therefore, the overhead of using the EDT runtime/platform functionality can be significant. This overhead can be avoided by using DBFetchCopy(C[j][k]), which would make a local copy of the data block(s) of C or portions of the data block(s) of C. Once the required data blocks or the required portions thereof are copied into a local buffer at the node at which this task is executed, C[j][k] can be accessed for each of the N iterations without needing to rely on the functionality provided by the EDT runtime/platform. The specified address/index "[j][k]" would still need to be translated into an address into the local buffer where the data block(s) of C or portions thereof were copied, but this translation can be performed by the node itself. This can improve the overall execution of the task.

Hoisting the Fetch Operators

Independently from the fetching operator generated, in some embodiments the compiler hoists the fetch operator as much as possible in order to limit the overhead of data management in the program. For instance, it is common that a tile in a computation loop nest only refers to a few data blocks. It may therefore be more efficient to fetch all the data blocks at the beginning of the tile and perform an uninterrupted computation on these data blocks. In some cases, the fetch operator hoisting is only performed when a single data block will be accessed for every memory reference and the hoisting may be repeated as much as possible, until reaching the outermost code level. Hoisting the data block fetching can have a major impact on performance in the generated programs.

Non-Polyhedral Operations

Improved R-Stream is a polyhedral compiler but in some embodiments, it also supports computations that cannot be described in the polyhedral model. For such computations, the user can provide an over-approximation of the accessed memory so that the program can still be safely parallelized and optimized by the compiler.

When the computation is not made of affine memory access functions, the compiler can generate new fetching instructions just before the memory references. The fetching instructions may use memory access functions to determine which data block should be used and which element in the data block corresponds to the array element specified in the original source program. This information can be used by the compiler to rewrite the original memory references to refer to the correct data element in the data blocks. As a result, the original, specified program is automatically transformed so that even its non-polyhedral portions can properly fetch and exploit the correct data block.

Because the memory accesses considered under the non-polyhedral model are not statically analyzable, the DB fetching instructions, which depend on the memory access functions, cannot be hoisted as it can be done for affine memory references. For instance, a program may perform a library function call to compute the memory address it refers to and library function calls are generally not free of memory effects. For such memory accesses, the DB fetching instruction which uses the result of the library call cannot be hoisted and must remain close to the memory reference. This limits the performance of the generated codes but only with the non-polyhedral parts of programs.

Experimental Results

We present the results that we produced using various embodiments of Improved R-Stream that can automatically generate optimized OCR code. These results highlight the performance and productivity benefits that compilers such as Improved R-Stream may offer to an extreme-scale/exascale software stack. We ran our experiments on a 48 core (96 thread) quad socket Intel Xeon (Ivy Bridge) server. We generated OCR code through embodiments of Improved R-Stream™ for a wide variety of kernels and benchmarks spanning multiple domains and application areas including linear algebra, multi-linear algebra (tensor computations), space-time adaptive processing (STAP), Synthetic Aperture Radar (SAR), etc.

We discuss our code generation and optimization experiments on the following benchmarks/kernels: (1) High Performance Geometric Multigrid (HPGMG) benchmark (Chebyshev kernel), CoSP2 proxy application (sparse matrix multiply kernel), High Performance Conjugate Gradients (HPCG) benchmark, and (4) SW4-4th order Seismic Waves propagation kernel. The discussion below demonstrates that the compile time techniques according to various embodiments that facilitate runtime creation, usage, and deletion of data blocks can improve the performance of an EDT platform while executing the above identified kernels and while executing other software, as well.

HPGMG: Chebyshev Kernel

Figure 7:
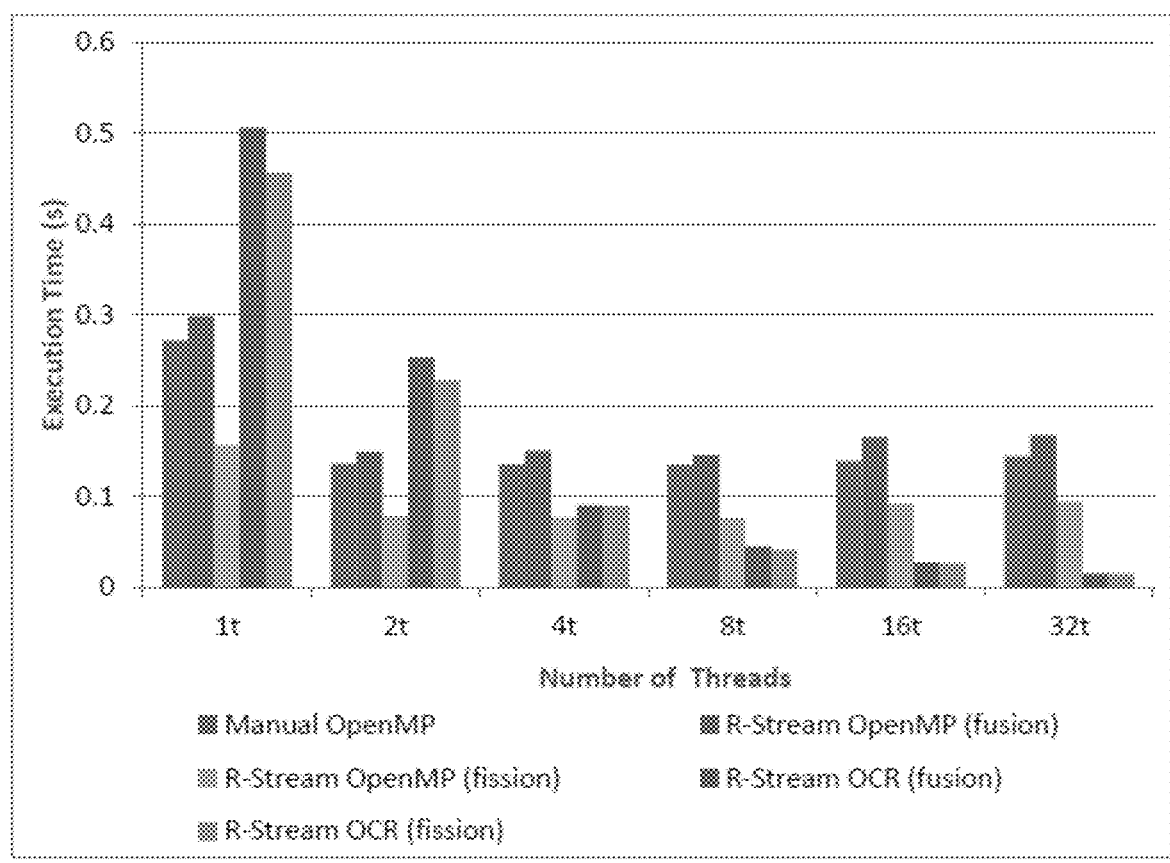
FIGS. 7-11 show the performance improvement results obtained for various kernels, according to various embodiments.

The HPGMG benchmark includes two different code bases—a finite volume code and a finite element code. We examined the timing of HPGMG benchmark and identified that the performance critical sections include smoothing, restriction, interpolation, and ghost zone exchange operations. For our experiments, we focused on optimizing coarser regions of the HPGMG "Chebyshev" smoother kernel to exploit the opportunities in executing these regions in a more asynchronous fashion in an EDT-based runtime such as OCR. We isolated a coarse grain Chebyshev kernel representing the entire smoothing function and parallelized the kernel using several methods, namely, hand parallelized OpenMP, Improved R-Stream-generated OpenMP (with and without fusion of different sweeps of smoother), and Improved R-Stream-generated OCR (with and without fusion of different sweeps of smoother), as shown in FIG. 7.

For convenience, we refer to code generated by different embodiments of Improved R-Stream as "Improved R-Stream code" or "Improved R-Stream's code." If the code is targeted/compiled for a particular EDT platform/runtime, we use the name of the runtime, as well. For example, "Improved R-Stream OCR code" refers to code compiled for OCR. Similarly, "Improved R-Stream's OpenMP code" refers to code compiled for OpenMP. Some embodiments of Improved R-Stream applied important compiler optimizations and generated OCR and OpenMP codes. The optimizations included one or more of: (1) smart fusion of Chebyshev smoother loops, (2) tiling across multiple smoothing steps, and (3) autotuned tile dimensions.

In general, Improved R-Stream code enabled a scalable asynchronous EDT-based execution. Specifically, it enabled on-the-fly just-in-time creation of EDTs and data blocks, and enabled dynamic creation and handling of dependence events between EDTs. This can avoid any unnecessary runtime overhead and enables scalable performance, which turned out be key for the Chebyshev kernel. Generally, Improved R-Stream's OCR code turned out to be the fastest among all parallelized codes when the number of threads was greater than two. Improved R-Stream OpenMP code was the fastest for the single thread and two thread runs, likely due to the compiler optimizations. When the number of threads was greater than two, Improved R-Stream OCR code was up to five times faster than hand parallelized OpenMP code, and was also faster than OpenMP OCR code generated using fusion, tiling, and/or autotuning.

Figure 8:
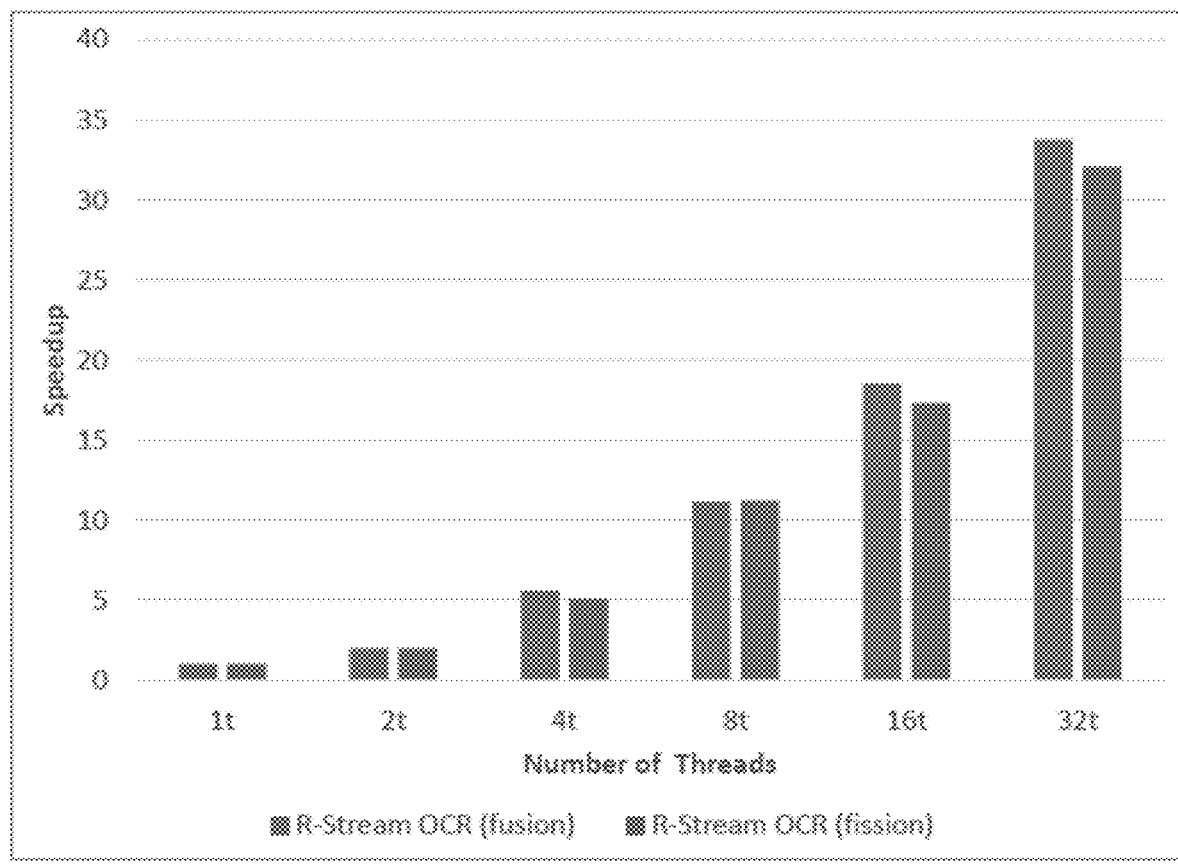

Our experiments also showed super-linear speedups when scaling Improved R-Stream's OCR code for the Chebyshev smoother from 1 to 32 OCR workers (also called processing nodes), as shown in FIG. 8. We generated tiled code and autotuned the tile sizes for each worker count. Super-linear speedup was observed at 4, 8, 16, and 32 workers. This may be due to better cache utilization of the tiled code tuned for each worker count. The number of EDTs and the number of floating point operations per EDT may depend on the tile size. The number of floating point operations per EDT in codes that achieved high performance was typically between 128 K and 256 K. In total, using embodiments of Improved R-Stream we generated approximately 8.75 million lines of OCR Chebyshev smoother code including approximately 3500 variants with 2500 lines of code each. The Chebyshev smoother code input to embodiments of Improved R-Stream included, however, less than 100 lines of code.

CoSP2: Sparse Matrix Matrix Multiply Kernel

Figure 9:
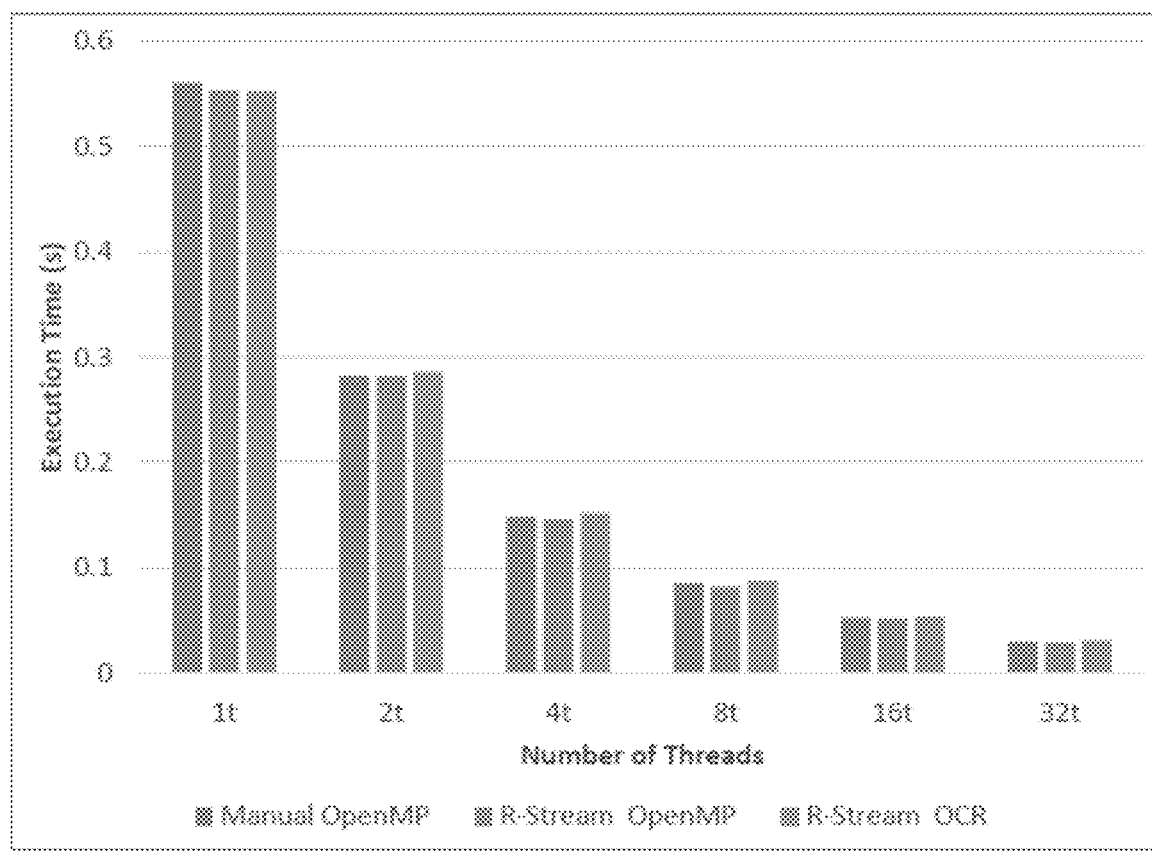

We evaluated the code generation and optimization capabilities of embodiments of Improved R-Stream using the sparse matrix matrix multiply (spmm) kernel of the CoSP2 proxy application from ExMatEx co-design center. The spmm kernel has indirect array accesses that make the computations irregular and thereby pose additional challenges to the compiler. Embodiments of Improved R-Stream™ successfully exploited, however, the available concurrency in spmm code and generated a locality-optimized parallel OCR Improved R-Stream code. We ran the different versions of spmm code using a large sparse matrix of size 12288×12288 that had 196608 non-zeros. The performance results of manually parallelized OpenMP version, Improved R-Stream's OpenMP code, and Improved R-Stream's OCR code are shown in FIG. 9. Improved R-Stream's OCR code exhibited performance comparable to that of Improved R-Stream OpenMP code. The Improved R-Stream OpenMP code performed better in many cases. This kernel has an outermost "doall" (synchronization-free parallel) loop that leaves the asynchronous runtime with no specific advantage to exploit. The proportion of runtime overhead in the overall execution time of this kernel may be a possible reason for OCR version's slightly lower performance.

HPCG

The HPCG benchmark is a tool for ranking computer systems and intended to be a complement to the High Performance LINPACK (HPL) benchmark that is currently used to rank the TOP 500 computing systems. HPCG is designed to represent the computational and data access patterns of a different and broader set of important scalable applications than those represented by HPL. HPCG is based on a simple additive Schwarz, symmetric Gauss-Seidel preconditioned conjugate gradient solver. HPCG includes different basic operations (kernels) such as sparse matrix-vector multiplication (SpMV), sparse triangular solve, vector updates, global dot products, and local symmetric Gauss-Seidel smoother.

We first evaluated the performance of HPCG benchmark without preconditioning. We generated multiple parallelized OpenMP and OCR versions of the benchmark using embodiments of Improved R-Stream, and compared the performance of Improved R-Stream code with those of various reference implementations that are usually hand-tuned. Specifically, we compared respective performances of Improved R-Stream OpenMP code and Improved R-Stream OCR code with that of the reference OpenMP implementation provided with the HPCG benchmark and the reference OCR implementation of the benchmark distributed in the main application repository of OCR, respectively.

Figure 10A:
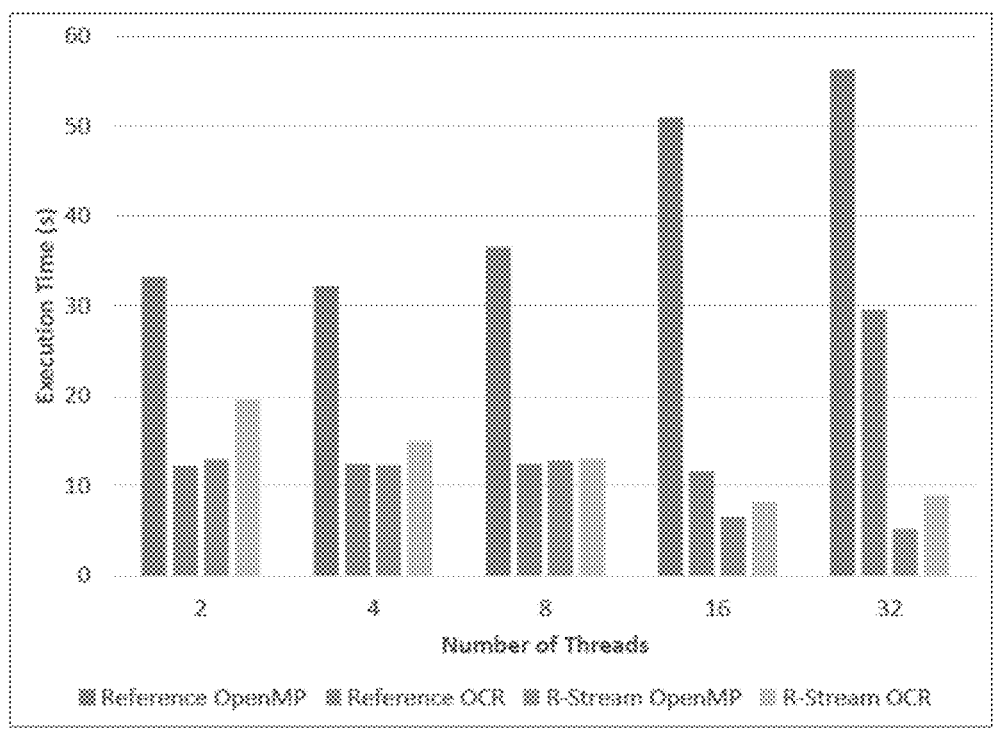

FIG. 10A shows the performance of manual OpenMP and OCR versions and Improved R-Stream OpenMP code and Improved R-Stream OCR code for the HPCG benchmark (without preconditioning). The performance of Improved R-Stream OpenMP code was found to be better than all other versions. The Improved R-Stream OCR code yielded better performance than the reference OCR version when the number of cores (processing nodes at the OCR platform) is high (e.g., greater than 4). Improved R-Stream OCR code performed better than the reference OpenMP code, and the Improved R-Stream OpenMP code performed better than the Improved R-Stream OCR code.

Figure 10B:
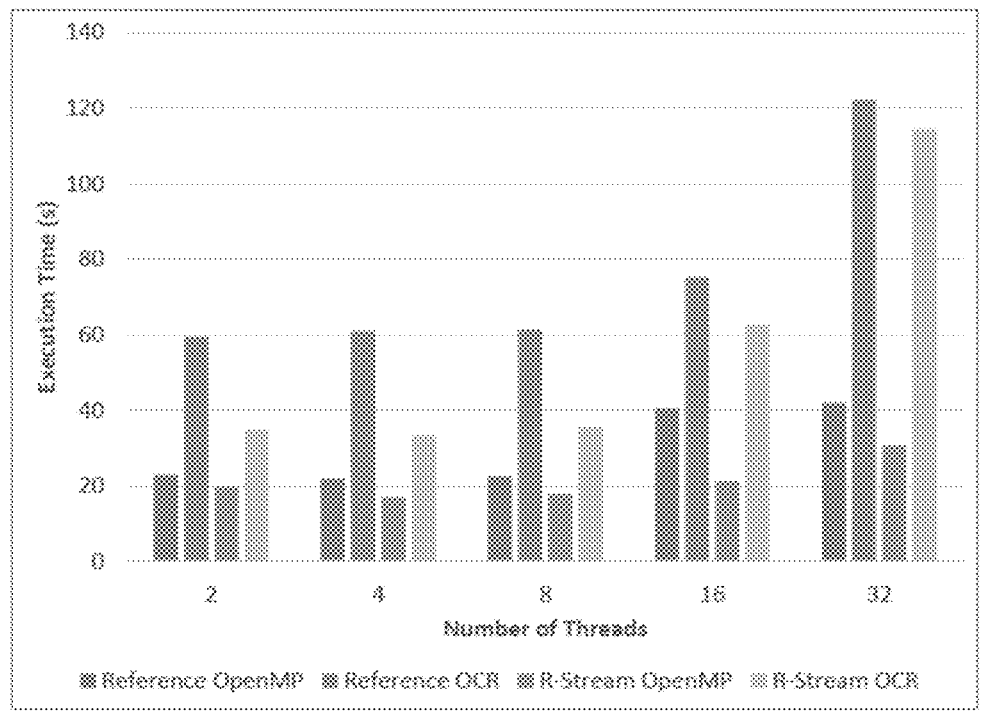

FIG. 10B shows the performance of manually tuned OpenMP and OCR codes with Improved R-Stream OpenMP code and Improved R-Stream OCR code generated for HPCG benchmark with preconditioning. The performance of Improved R-Stream OpenMP code was found to be better than all other versions. The Improved R-Stream OCR code improved performance of the platform more than the reference OCR version.

SW4

Figure 11:
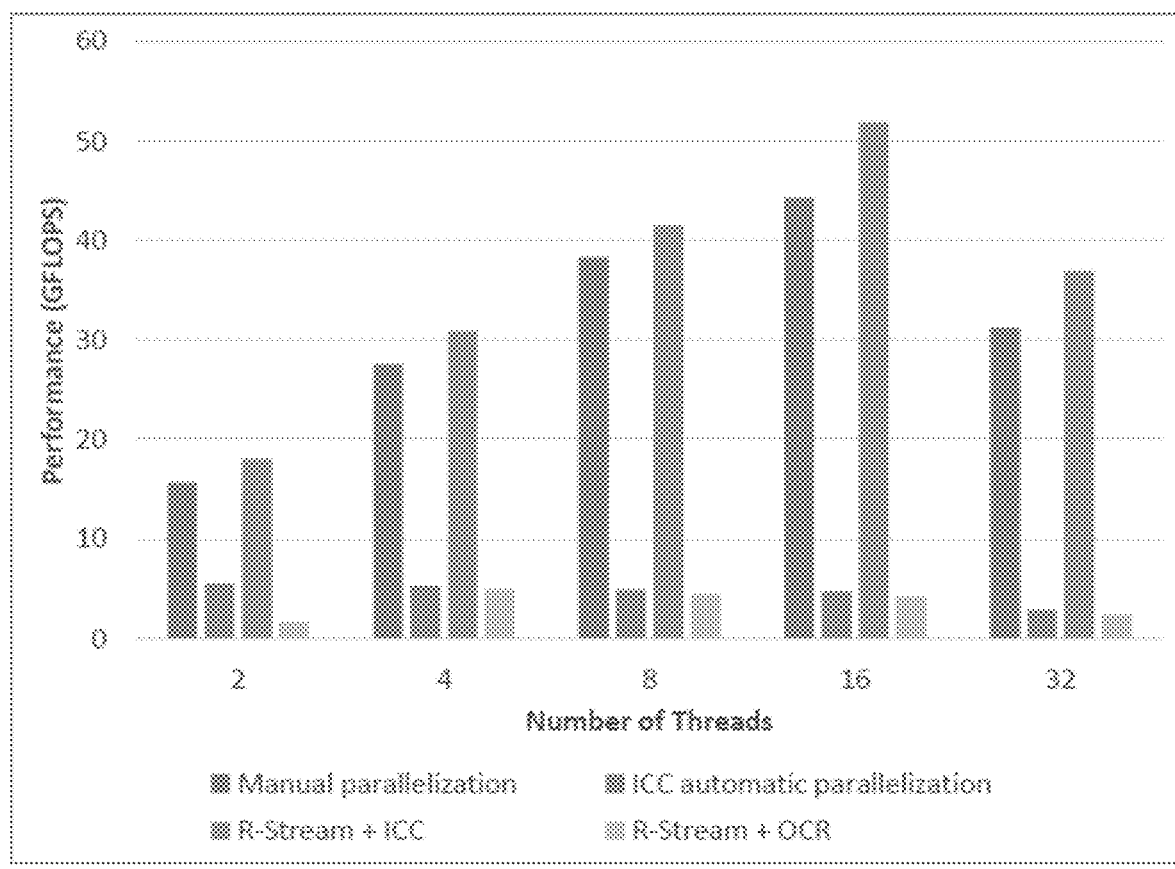

SW4 is a 4th order stencil kernel related to seismic wave propagation. We evaluated the performance of the SW4 stencil code. Specifically, we compared the performance of Improved R-Stream OpenMP code and Improved R-Stream OCR code to that of automatic parallelization (and vectorization) performed by ICC and a straightforward OpenMP implementation performed manually. FIG. 11 shows the performance results measured in terms of GFLOPS. Improved R-Stream codes are able to achieve a better performance level compared to that of the manually parallelized program, and to the outcome of ICC. The performance of the Improved R-Stream OCR code matched that of the ICC automatically parallelized code. The Improved R-Stream OCR code was slower than the manually parallelized code and Improved R-Stream OpenMP code. The SW4 kernel has a "doall" (synchronization-free parallel) loop nest that leaves the asynchronous runtime with no specific advantage to exploit and, in fact, the runtime may incur more overhead with the current implementation of OCR scheduler.

CONCLUSION

We have developed new capabilities within Published R-Stream™ parallelizing compiler for automatic generation and optimization of code and data management targeted towards EDT platforms such as OCR, an exascale-ready asynchronous task-based runtime. Through these capabilities we have demonstrated the following: (1) automatic code generation and data management enables high productivity, (2) the ability to find more concurrency and data locality, and to generate different versions of locality-optimized parallel code, to improve performance and/or energy efficiency of the platform, and (3) the ability to achieve parallelization on an asynchronous EDT platform in a scalable manner, providing the basis for seamlessly scaling the compilation to adaptive extreme-scale and exascale architectures.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A system for creating, distributing, and deleting data blocks to be used by one or more tasks to be executed by a plurality of processing nodes in an event-driven task (EDT) platform, the system comprising: a first processor; and a first memory in electrical communication with the first processor, the first memory comprising instructions which, when executed by a processing unit comprising at least one of the first processor and a second processor, and in electronic communication with a memory module comprising at least one of the first memory and a second memory, configure the processing unit as a compiler programmed to: identify a first data variable in the source code of the program; determine from the source code a size and initialization of the first data variable; determine a first set of data blocks associated with the first data variable, based on at least one of: (i) a specified data block size, (ii) a number of processing nodes in the EDT platform; and (iii) memory capacity at a processing node in the EDT platform; and specify in a modified program, a first data-block-creation task for creating and initializing a first data block from the first set of data blocks during execution of the modified program by the EDT platform, wherein the processing unit is further programmed to: assemble a group of predecessor tasks by inserting in the group each immediate predecessor task of each task using the first data block, wherein none of the predecessor tasks uses the first data block; and designate each predecessor task in the group as a predecessor of the first data-block-creation task.

2. The system of claim 1, wherein the processing unit is further programmed to: identify a first program-based task using the first data variable; and determine usage of the first data variable by the first program-based task, the usage being described using at least one of: (i) an order of dimensions of the first data variable, (ii) a tile size associated with the first data variable, (iii) a number of data elements of the first data variable that are used by the first program-based task, and (iv) contiguity of the data elements of the first data variable that are used by the first program-based task, wherein determination of the first set of data blocks associated with the first data variable is further based on, at least in part, the determined usage of the first data variable by the first program-based task.

3. The system of claim 1, wherein the processing unit is further programmed to: identify for the first data block from the first set of data blocks, all tasks using the first data block; and designate the first data-block-creation task as a predecessor to all tasks using the first data block.

4. The system of claim 3, wherein the processing unit is further programmed to: assemble a group of predecessor tasks by inserting in the group each predecessor task of each task using the first data block, wherein none of the predecessor tasks uses the first data block; and designate at least one predecessor task in the group as a predecessor of the first data-block-creation task.

5. The system of claim 1, wherein the processing unit is further programmed to: identify for the first data block from the first set of data blocks, all tasks using the first data block; specify in the modified program, a first data-block-deletion task for deleting the first data block; and designate each task using the first data block as a predecessor to the first data-block-deletion task.

6. The system of claim 5, wherein the processing unit is further programmed to: assemble a group of successor tasks by inserting in the group each immediate successor task of each task using the first data block, wherein none of the immediate successor tasks uses the first data block; and designate each successor task in the group as a successor of the first data-block-deletion task.

7. The system of claim 5, wherein the processing unit is further programmed to: assemble a group of successor tasks by inserting in the group each successor task of each task using the first data block, wherein none of the successor tasks uses the first data block; and designate at least one successor task in the group as a successor of the first data-block-deletion task.

8. The system of claim 1, wherein the processing unit is further programmed to: identify a first program-based task using the first data variable; and associate with the first program-based task an EDT platform directive for data block distribution based on the first set of data blocks.

9. The system of claim 1, wherein the processing unit is further programmed to: identify a first program-based task using the first data variable; identify a data object within the first program-based task, wherein the data object is associated with the first data block; identify: (i) a first set of data elements of the data object that the first program-based task reads only and does not write; and (ii) a second set of data elements of the data object that the first program-based task writes; and determine the first set of data blocks comprises including therein: (i) at least one data block that comprises at least a portion of the first set of data elements and excludes the second set of data elements; and (ii) at least one data block that comprises at least a portion of the second set of data elements and excludes the first set of data elements.

10. The system of claim 1, wherein the processing unit is further programmed to: generate EDT platform directives for distribution of the first set of data blocks across the plurality of processing nodes of the EDT platform based on a position of each data block in the first data variable, the directive being based on a specified manner of data block distribution.

11. The system of claim 1, wherein the processing unit is further programmed to: identify a first program-based task associated with the source code of the program, the first program-based task using the first data variable; determine a plurality of data objects that are associated with the first data variable and that are used by the first program-based task; identify from the first plurality of data blocks a set of data blocks that is associated with the plurality of data objects; and associate with the first-program based task an EDT platform directive for data block distribution based on the respective set of data blocks.

12. A system for facilitating data access by a task to be executed by one of a plurality of processing nodes in an event-driven task (EDT) platform, the system comprising: a first processor; and a first memory in electrical communication with the first processor, the first memory comprising instructions which, when executed by a processing unit comprising at least one of the first processor and a second processor, and in electronic communication with a memory module comprising at least one of the first memory and a second memory, configure the processing unit as a compiler programmed to: identify a first data object used by a first task that is derived from source code of a program and that is executable on a first processing node of the EDT platform; identify a first data block associated with the first data object, the first data block being stored at a second processing node; compute a data access parameter corresponding to the first data object; and if the data access parameter is at least equal to a specified threshold, insert in the first task a customized data access operation, for accessing the first data block via a local copy thereof at the first processing node; and otherwise, insert in the first task a data access operation supplied by the EDT platform, for accessing the first data block from the second processing node, wherein the data access parameter comprises a reuse factor associated with the first data object.

13. The system of claim 12, wherein the processing unit is further programmed to: compute the reuse parameter: by counting and using a number of accesses within the first task to the first data object; and by determining and using at least one of: a number of data elements in the first data block, size of a data element in the first data block, a number of data elements in the first data object, and size of a data element in the first data object.

14. The system of claim 12, wherein the processing unit is further programmed to: compute the data access parameter by determining and using at least one of a number of data elements in the first data block, size of a data element in the first data block, a number of data elements in the first data object, size of a data element in the first data object, expected time to copy the first data block, and expected time to construct the first data object at the first node.

15. The system of claim 12, wherein to insert the operations for accessing the first data block via the local copy thereof, the processing unit is programmed to insert operations to at least one of: copy from the second processing node at least a portion of the first data block into a local buffer at the first processing node, the local copy comprising contents of the local buffer; and translate a global address associated with the first data object into a local address associated with the local copy.

16. The system of claim 15, wherein a characteristic of the first data block is different from a corresponding characteristic of the local copy, the characteristic being selected from the group consisting of: a dimensionality of the first data block, a size of the first data block, a number of data elements in the first data block, and contiguity of the first data block.

17. The system of claim 15, wherein the processing unit is further programmed to: identify a second data block associated with the first data object, the second data block being stored at a third processing node; and configure the customized data access operation for accessing the second data block via a local copy thereof at the first processing node, by copying from the third processing node at least a portion of the second data block into the local buffer at the first processing node.

18. The system of claim 12, wherein: the first task comprises a loop nest having at least one loop; and to insert the operations for accessing the first data block via the local copy thereof, the processing unit is programmed to hoist the operations for accessing the first data block via the local copy thereof outside of at least one loop of the loop nest.

19. The system of claim 12, wherein: the first task comprises a loop nest having at least one loop; and to insert the operations for accessing the first data block from the second processing node via the function supplied by the EDT platform, the processing unit is programmed to hoist the operations for accessing the first data block from the second processing node via the function supplied by the EDT platform outside of at least one loop of the loop nest.

20. The system of claim 12, wherein the processing unit is further programmed to: select a data variable specified in the source code of the program; determine a plurality of data blocks associated with the data variable; and generate EDT platform directives for distribution of the plurality of data blocks across the plurality of processing nodes of the EDT platform based on a position of each data block in the corresponding data variable, the directive being based on a specified manner of data block distribution.

21. The system of claim 12, wherein the processing unit is further programmed to: derive a second task associated with the source code of the program, the second task using a data variable specified in the source code of the program; determine a plurality of data objects that are associated with the data variable and that are used by the second task; determine a plurality of data blocks associated with the data variable; identify from the plurality of data blocks a set of data blocks that is associated with the plurality of data objects; and associate with the second task an EDT platform directive for data block distribution based on the respective set of data blocks.

22. The system of claim 12, wherein the processing unit is further programmed to: derive a second task associated with the source code of the program; identify a second data object associated with the second task; identify: (i) a first set of data elements of the second data object that the second task reads only and does not write; and (ii) a second set of data elements of the second data object that the second task writes; determine a plurality of data blocks associated with the second data object, the plurality of data blocks comprising: (i) at least one data block that comprises at least a portion of the first set of data elements and excludes the second set of data elements; and (ii) at least one data block that comprises at least a portion of the second set of data elements and excludes the first set of data elements.

* * * * *

UNITED STATES PATENT AND TRADEMARK OFFICE
CERTIFICATE OF CORRECTION

PATENT NO. : 10,558,479 B2
APPLICATION NO. : 16/363278
DATED : February 11, 2020
INVENTOR(S) : Muthu Manikandan Baskaran et al.

It is certified that error appears in the above-identified patent and that said Letters Patent is hereby corrected as shown below:

In the Specification

In Column 1, Line 16, insert:
-- STATEMENT OF GOVERNMENT SUPPORT
This invention was made with government support under Award No. B608115 under subcontract No. CW1989333, awarded by the U.S. Department of Energy, Lawrence Livermore National Security. The government has certain rights in the invention. --

Signed and Sealed this
Twentieth Day of September, 2022

Katherine Kelly Vidal
*Director of the United States Patent and Trademark Office*